(12) United States Patent
Fauver et al.

(10) Patent No.: US 6,856,712 B2
(45) Date of Patent: Feb. 15, 2005

(54) MICRO-FABRICATED OPTICAL WAVEGUIDE FOR USE IN SCANNING FIBER DISPLAYS AND SCANNED FIBER IMAGE ACQUISITION

(75) Inventors: Mark E. Fauver, Seattle, WA (US); Eric J. Seibel, Seattle, WA (US); Chris M. Brown, Seattle, WA (US); Per G. Reinhall, Seattle, WA (US); Quinn Y. J. Smithwick, Bothell, WA (US)

(73) Assignee: University of Washington, Seattle, WA (US)

( * ) Notice: Subject to any disclaimer, the term of this patent is extended or adjusted under 35 U.S.C. 154(b) by 443 days.

(21) Appl. No.: 09/994,377

(22) Filed: Nov. 26, 2001

(65) Prior Publication Data

US 2002/0064341 A1 May 30, 2002

Related U.S. Application Data

(63) Continuation-in-part of application No. 09/850,594, filed on May 7, 2001.
(60) Provisional application No. 60/253,445, filed on Nov. 27, 2000.

(51) Int. Cl.[7] ............................................... G02B 6/00
(52) U.S. Cl. ............................ 385/12; 385/31; 385/43; 385/33
(58) Field of Search .......................... 385/12, 31, 33, 385/34, 39, 42, 43, 123, 24, 25

(56) References Cited

U.S. PATENT DOCUMENTS

| | | | |
|---|---|---|---|
| 4,118,270 A | 10/1978 | Pan et al. .................... | 156/659 |
| 4,265,699 A | 5/1981 | Ladany ........................ | 156/657 |
| 4,410,235 A | 10/1983 | Klement et al. ........... | 350/96.18 |
| 4,743,283 A | * 5/1988 | Borsuk ........................ | 65/387 |
| 4,804,395 A | * 2/1989 | Clark et al. ................. | 65/387 |
| 4,824,195 A | 4/1989 | Khoe ........................ | 350/96.18 |
| 5,037,174 A | 8/1991 | Thompson .................... | 385/33 |

(List continued on next page.)

FOREIGN PATENT DOCUMENTS

| | | | | |
|---|---|---|---|---|
| EP | 1 142 529 A1 | 10/2001 | ............ | A61B/1/00 |
| JP | 2001174744 A2 | 6/2001 | ........... | G02B/26/10 |

OTHER PUBLICATIONS

Yamada, Jun–Ichi et al. Oct. 1980. Characteristics of a Hemispherical Microlens for Coupling Between a Semiconductor Laser and Single–Mode Fiber. *IEEE J. Quant. Electron.* QE–16:10:1067–1072.

Russo, Vera et al. Oct. 1, 1984. Lens–ended Fibers for Medical Applications: A New Fabrication Technique. *Appl. Opt.* 23:19:3277–3283.

Lee, Kyung S. and Frank S. Barnes. Oct. 1, 1985 Microlenses on the End of Single–mode Optical Fibers for Laser Applications. *Appl. Opt.* 24:19:3134–3139.

(List continued on next page.)

*Primary Examiner*—Brian M. Healy
(74) *Attorney, Agent, or Firm*—Ronald M. Anderson

(57) ABSTRACT

Small, rugged scanners micro-fabricated from commercial optical fibers to form waveguides or other structures. The scanning waveguide has a distal portion on which is formed a non-linear taper with a diameter that decreases toward a distal end. Optionally, a hinge portion having a reduced diameter can be formed in the distal portion, improving the scanning properties of the waveguide. A micro-lens can be integrally formed at the distal tip of the waveguide with either a droplet of an optical adhesive, or by using an energy beam to melt the material of the waveguide to form a droplet. The droplet is shaped with an externally applied force. When mechanically driven in vibratory resonance, the tip of the optical waveguides moves in linear or two-dimensional scan patterns of relatively high amplitude and frequency, and large field of view. The scanner can be used either for image acquisition or image display.

44 Claims, 11 Drawing Sheets

(3 of 11 Drawing Sheet(s) Filed in Color)

U.S. PATENT DOCUMENTS

| | | | |
|---|---|---|---|
| 5,247,174 A | 9/1993 | Berman | 250/235 |
| 5,272,330 A | 12/1993 | Betzig et al. | 250/216 |
| 5,394,500 A | 2/1995 | Marchman | 385/123 |
| 5,459,803 A | 10/1995 | Yamane et al. | 385/33 |
| 5,480,046 A | 1/1996 | Filas et al. | 216/7 |
| 5,563,969 A | 10/1996 | Honmou | 385/35 |
| 5,570,441 A | 10/1996 | Filas et al. | 385/43 |
| 5,627,922 A * | 5/1997 | Kopelman et al. | 385/12 |
| 5,703,979 A | 12/1997 | Filas et al. | 385/43 |
| 5,727,098 A | 3/1998 | Jacobson | 385/31 |
| 5,894,122 A * | 4/1999 | Tomita | 250/234 |
| 5,939,709 A * | 8/1999 | Ghislain et al. | 250/216 |
| 6,046,720 A | 4/2000 | Melville et al. | 345/108 |
| 6,091,067 A | 7/2000 | Drobot et al. | 250/234 |
| 6,294,775 B1 | 9/2001 | Seibel et al. | 250/208.1 |
| 6,327,493 B1 | 12/2001 | Ozawa et al. | 600/476 |
| 6,441,359 B1 * | 8/2002 | Cozier et al. | 250/216 |
| 2001/0055462 A1 * | 12/2001 | Seibel | 385/147 |
| 2002/0064341 A1 * | 5/2002 | Fauver et al. | 385/25 |

OTHER PUBLICATIONS

Barnard, Chris W. and John W. Y. Lit. May 20, 1991. Single–mode Fiber Microlens with Controllable Spot Size. *Appl. Opt.* 30:15:1958–1962.

Barnard, Chris W. and John W. Y. Lit. Apr. 20, 1993. Mode Transforming Properties of Tapered Single–mode Fiber Microlens. *Appl. Opt.* 30:15:1958–1962.

* cited by examiner

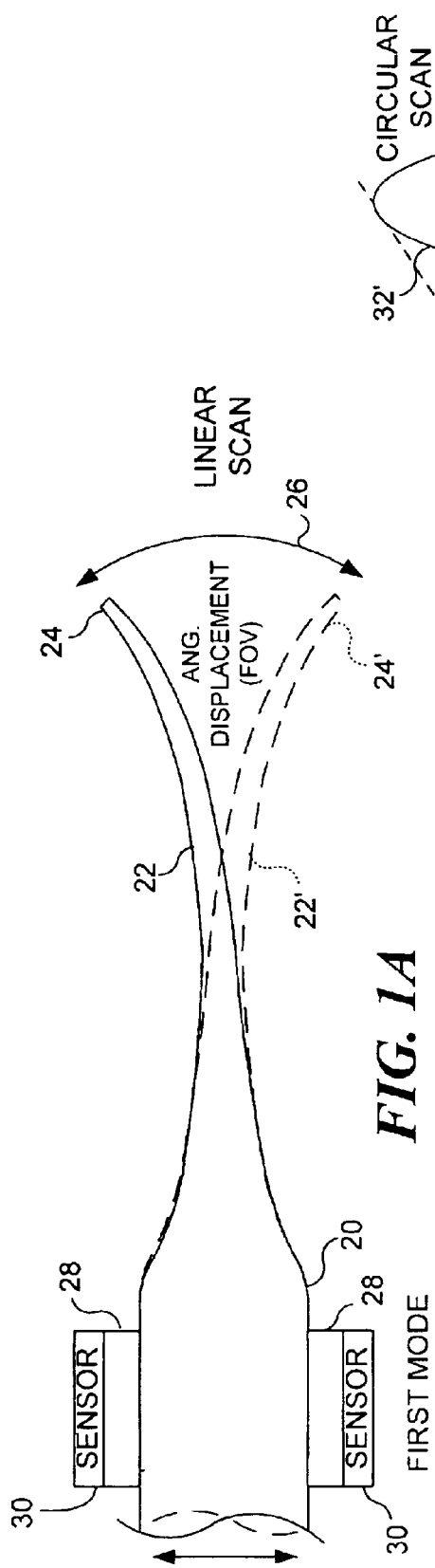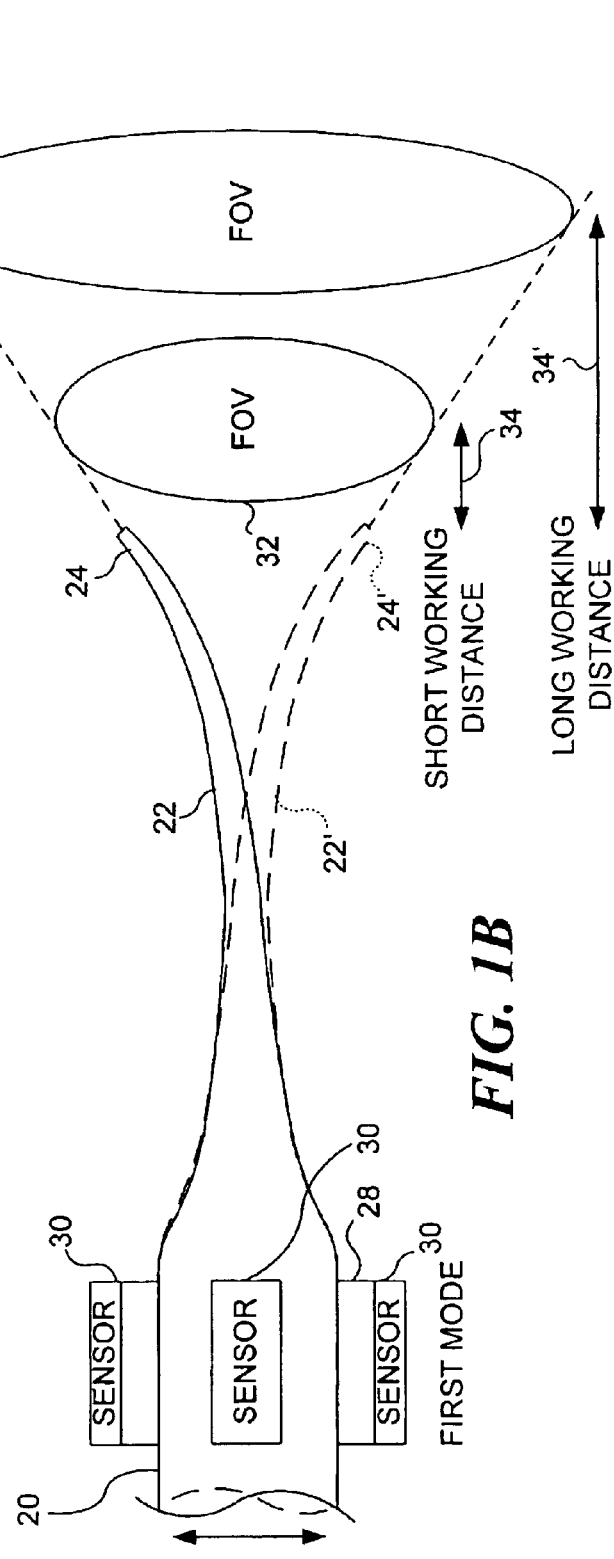

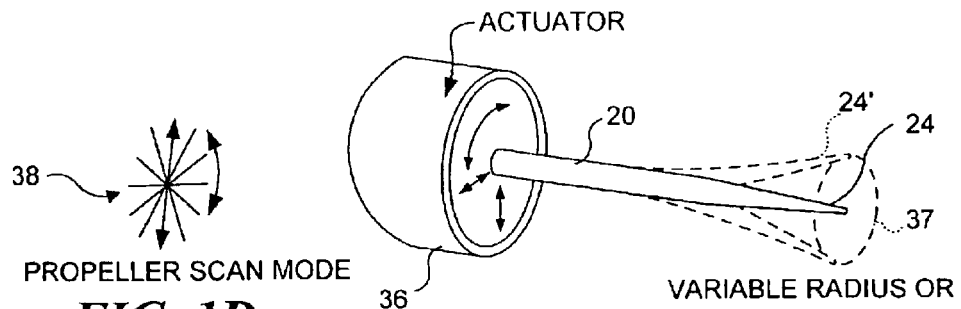
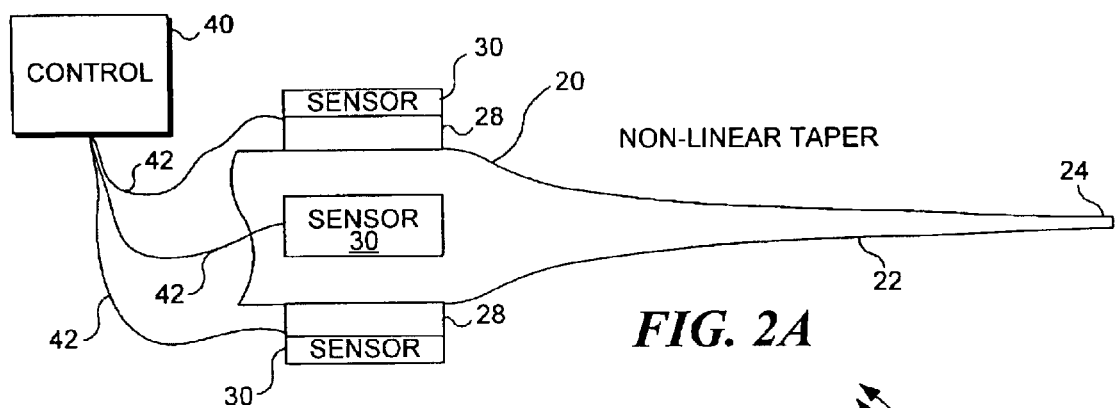
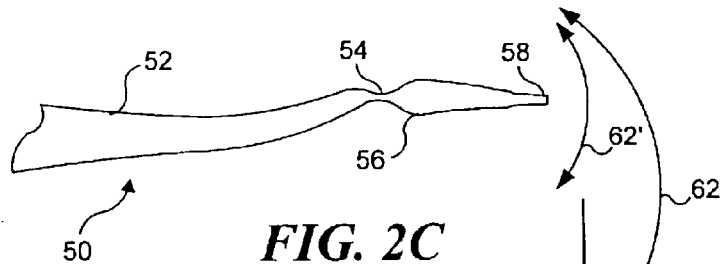
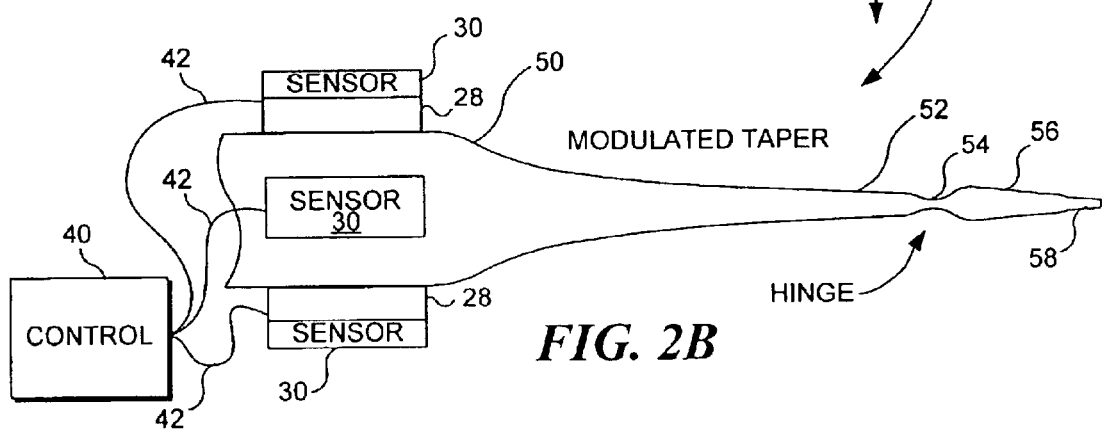

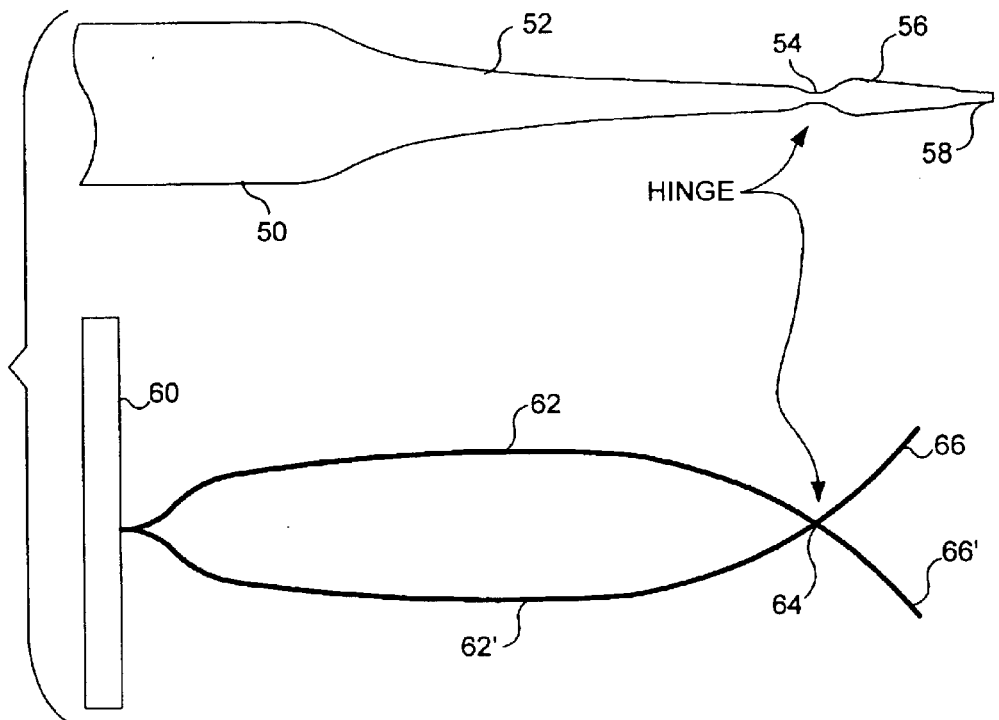
*FIG. 3*
*FIG. 12A*  *FIG. 12B*
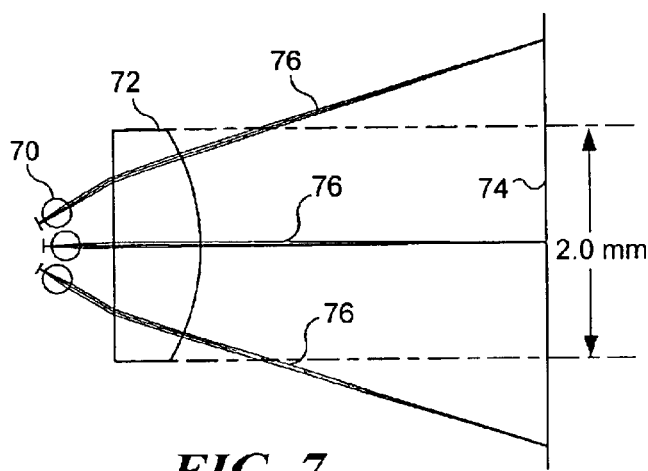
*FIG. 7*

MICRO-FABRICATED OPTICAL WAVEGUIDE FOR USE IN SCANNING FIBER DISPLAYS AND SCANNED FIBER IMAGE ACQUISITION

RELATED APPLICATIONS

This application is based on a prior copending provisional application Ser. No. 60/253,445, filed on Nov. 27, 2000, the benefit of the filing date of which is hereby claimed under 35 U.S.C. § 19(e), and is a continuation-in-part of U.S. patent application Ser. No. 09/850,594, filed May 7, 2001, pending, the benefit of the filing date of which is hereby claimed under 35 U.S.C. § 120.

FIELD OF THE INVENTION

The present invention generally relates to optical fiber scanners, and more specifically, to a micro-fabricated optical fiber that is driven at resonance to scan a relatively large field of view.

BACKGROUND OF THE INVENTION

Most optical scanning applications use a moving mirror, either rotating or oscillating. A laser beam is often projected onto the moving mirror to scan the beam across a specified linear or two-dimensional (2D) (raster) pattern at a frequency that is sufficient for the particular application. For optical displays, the field of view (FOV) is determined by the scanning amplitude and the particular optical design. There is a minimum frequency (rate) at which scanning displays need to be refreshed, which is determined by the human perception of flicker from a scanned display. For ubiquitous raster scanning displays, such as cathode ray tubes (CRTs) used in televisions and computer monitors, the display refresh rate is typically 30 to 60 Hz. Although a CRT employs an electron-beam for scanning an electro-optical display screen, the same requirements for scan frequency and amplitude (that determine the FOV) generally apply for all types of scanning displays. Thus, for a super video graphics array (sVGA) display having a CRT resolution of 800×600 pixels, the minimum horizontal scan rates are 40 kHz for unidirectional and 20 kHz for bidirectional scanning.

Combining both high resolution (>400,000 pixels) and wide FOV (>30°) in a single display is a difficult technical challenge, limiting the application of optical scanning for small size, low cost optical scanners that have both high-resolution and wide FOV. There is a tradeoff between optical scanning frequency versus scanning amplitude (FOV) for all mirror-scanning devices. The faster the mirror scans, the greater the forces acting on the mirror, which deforms the mirror surface, degrading image quality. This limitation is especially true for the small, low cost resonant mirror scanners. Rotating polygon mirror scanners can overcome this limitation or tradeoff between scan frequency and amplitude, except they are usually bulky, noisy, and costly. In the case of a resonant mirror scanner, the mirror cannot scan more than a few degrees in amplitude at frequencies of 20 to 40 kHz, as required for sVGA raster scanning displays. Since the optical beam reflects from the scanning mirror, the optical FOV is twice the total mirror deflection angle (i.e., the FOV=2 times mirror scan amplitude). However, at sVGA resolution and scan frequencies, optical FOVs on the order of 30° to 60° cannot be achieved using a low cost resonant mirror scanner as the basis for micro displays.

Recently, resonant mirror optical scanning systems have been developed that include silicon micro-machining techniques to make micro-electromechanical systems (or MEMS) devices. In theory, this technique can manufacture durable mirror-based optical scanners at lower costs. Nonetheless, there is still a tradeoff between scan amplitude and scan frequency of the resonant scanning mirror versus resolution. In practice, the relatively high capital investment required for creating a MEMS fabrication facility is a barrier for most companies. To date, a mirror-based resonant scanner fabricated as a MEMS device has yet to be demonstrated as a viable method for manufacturing low cost optical scanners for visual displays of wide FOV and at video scan rates.

There is a growing market for micro-optical displays as well as small optical sensors, optical switches, and scanning image acquisition systems. For example, a low cost micro-optical scanner is essential for spectacle-mounted, retinal light scanning displays and micro-displays that may be embedded in future cellular telephones. Moreover, there is a commercial need for low cost, large-scale (panoramic) optical displays, because larger CRT displays are uneconomical in energy and space. There is also a growing market for optical sensing and switching, especially in conjunction with fiber-optic sensing and communication applications. Finally, the lack of low cost micro-optical scanners with a wide FOV has been the most significant barrier for reducing the size of scanning image acquisition systems for use in surveillance, industrial inspection and repair, machine and robotic vision systems, micro-barcode scanners, and minimally-invasive medical imaging (flexible endoscopes).

SUMMARY OF THE INVENTION

In accord with the present invention, a scanner is defined that is usable for both image acquisition and image display. One embodiment of the scanner includes a waveguide having a distal end and a proximal end, with the distal end being formed to have a nonlinear taper that decreases in size along a longitudinal axis of the waveguide, toward a distal tip of the waveguide. As used herein and in the claims that follow, a waveguide conveys electro-magnetic energy such as light between its opposite ends. In most of the discussion set forth below, an optical fiber is a preferred kind of waveguide in accord with the present invention, but it is not intended that the present invention be in any way limited to an optical fiber or limited to only conveying visible light. Indeed, as used herein, the term "light" is intended to encompass all forms of electro-magnetic energy. An important aspect of the present invention is the provision of a non-linear tapered structure that is driven into a near resonant condition to move and scan in a desired pattern.

To cause the movement of the waveguide, a scanning actuator is disposed adjacent to the distal end of the waveguide and drives the distal tip of the waveguide to move in a desired scanning motion. A control circuit is coupled to the scanning actuator and is adapted to selectively energize the scanning actuator to move the distal tip of the waveguide so as to scan a FOV. Another embodiment of the device includes a micro-lens coupled to the distal tip of the waveguide and is not limited to a waveguide having a taper that is nonlinear.

Several variations of the waveguide are disclosed, including one in which the distal portion of the waveguide comprises at least two distinct sections of differing radii around the longitudinal axis of the waveguide. Each section has a different resonance when driven by the scanning actuator. One of the two sections can be driven to resonate about a first axis that is substantially orthogonal to the longitudinal axis, while the other section is driven to resonate about a second axis that is substantially orthogonal to both the longitudinal axis and to the first axis. Consequently, a scan rate of the waveguide about the first axis is different than about the second axis.

One embodiment of the waveguide includes a hinge portion adjacent to the distal tip of the waveguide. The hinge portion is reduced in cross-sectional size relative to proximal and distal portions of the waveguide that are immediately adjacent to the hinge portion. Also, the hinge portion is preferably disposed along the longitudinal axis of the waveguide where a node is formed when the waveguide is driven into resonance by the scanning actuator, so that the distal tip disposed beyond the hinge portion is driven at least at a resonance of mode two. The distal tip disposed beyond the hinge portion is substantially more rigid than the hinge portion to maintain a substantially linear relationship between the angle of the distal tip and a driving force acting on the distal tip.

A mass element can be disposed proximate the distal tip of the waveguide to reduce a positional displacement of the distal tip without substantially reducing an angular displacement of the distal tip when the distal end of the waveguide is driven by the scanning actuator. For example, the mass element can comprise a lens that is coupled to the distal tip of the waveguide. Also, the lens is integrally formed from the waveguide.

To avoid nonlinear vibrational motion of the distal tip, the scanning actuator drives the distal end of the waveguide into a near resonant motion in at least a second order mode. The scanning actuator applies force adjacent to the distal end of the waveguide, causing the distal tip of the waveguide to describe either a circular motion, a helical motion, a Lissajous pattern, an arc, a whirl pattern, a rotating elongated propeller pattern, and a raster scanning pattern. In addition, in at least one embodiment, the scanning actuator applies substantially orthogonal forces to the waveguide at a point adjacent to its distal end.

The scanner may further include a linear actuator that is coupled to the control circuit. The linear actuator periodically varies a force applied to the waveguide that is directed generally along the longitudinal axis of the waveguide. The scanning actuator causes the distal end of the waveguide to describe an arc, and the controller controls the displacement of the wave guide by the linear actuator and the scanning actuator so as to substantially flatten the arc.

The distal tip of the waveguide can be driven in a pattern that scans a region disposed adjacent to the distal tip of the waveguide. For example, the pattern can enable image acquisition of or display an image on a region disposed adjacent to the distal tip of the waveguide. The scanning actuator preferably comprises either a bimorph piezoelectric actuator or a tube actuator.

Another aspect of the present invention is directed to a method for creating a hinge in a waveguide. The method includes the steps of providing a waveguide with a tapered portion having a cross-sectional size that decreases toward an end of the waveguide, along a longitudinal axis of the waveguide. A material comprising the waveguide is then heated at a point along the tapered portion where it is desired to produce the hinge. Sufficient heat is applied so that the material flows and is capable of being deformed, but remains viscous. The cross-sectional size of the tapered portion at the point where the hinge is desired is reduced after the material has been heated, to produce a necked-down section comprising the hinge. The taper portion of the waveguide is then allowed to cool to an ambient temperature. The waveguide bends more readily at the hinge than at other portions of the tapered section when driven by an applied force. Preferably, the material is heated using a coherent light source.

Yet another aspect of the invention is directed to a different method for creating a hinge in a waveguide. In this method, the tapered portion of the waveguide is immersed into fluid having a plurality of layers, including an acid layer disposed between inert liquid layers. The tapered portion is immersed until a point along the tapered portion where it is desired to produce the hinge is disposed in the acid layer. The acid layer etches the tapered portion of the waveguide to produce a necked-down section comprising the hinge.

Still another aspect of the present invention is directed at two different methods for forming the micro-lens at the distal tip of the waveguide. In the first method, a drop of an optical adhesive material is applied at the distal end of the of the waveguide. The waveguide is then rotated with the waveguide directed radially relative to a center of rotation. The rotation causes the optical adhesive material to form a generally spherical shaped, micro-lens at the distal end of the waveguide. Finally, the optical adhesive material is cured with either ultraviolet (UV) light or with heat. In the second method, an energy beam, such as a laser, is used to heat the distal tip of the waveguide locally melt the material to form the micro-lens. Shaping of the micro-lens is accomplished using centrifugal force, or by application of an axially directed force. The external force is applied during the period of time in which the material that will comprise the micro-lens remains in a molten or low viscosity state.

BRIEF DESCRIPTION OF THE DRAWING FIGURES

The file of this patent contains at least one drawing executed in color. Copies of this patent with color drawing (s) will be provided by the Patent and Trademark Office upon request and payment of the necessary fee.

The foregoing aspects and many of the attendant advantages of this invention will become more readily appreciated as the same becomes better understood by reference to the following detailed description, when taken in conjunction with the accompanying drawings, wherein:

FIGS. 1A and 1B are schematic diagrams that respectively illustrate a FOV of the tip of an optical fiber scanner that is angularly displaced, and an optical fiber that is moved in a circular scanning pattern in accord with the present invention;

FIG. 1C is an isometric schematic view of a part of a tube piezoelectric actuator driving a tapered optical in a variable radius or spiral scan;

FIG. 1D is a schematic illustration of a propeller scan mode of a tapered optical fiber in accord with the present invention;

Figure 4:
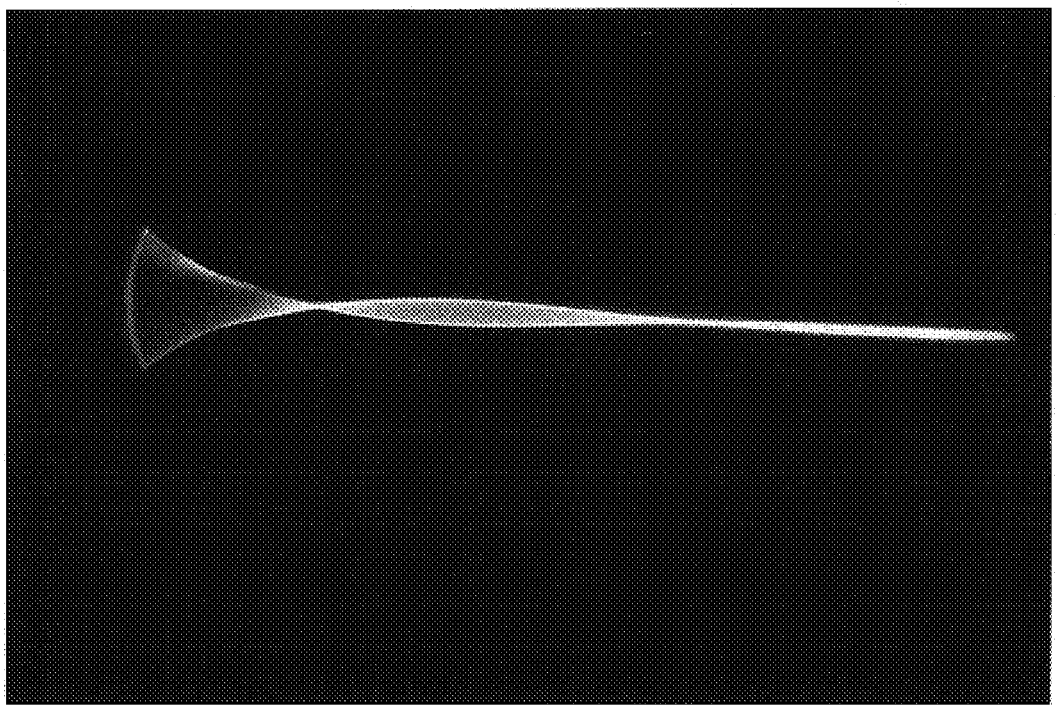
Figure 5:
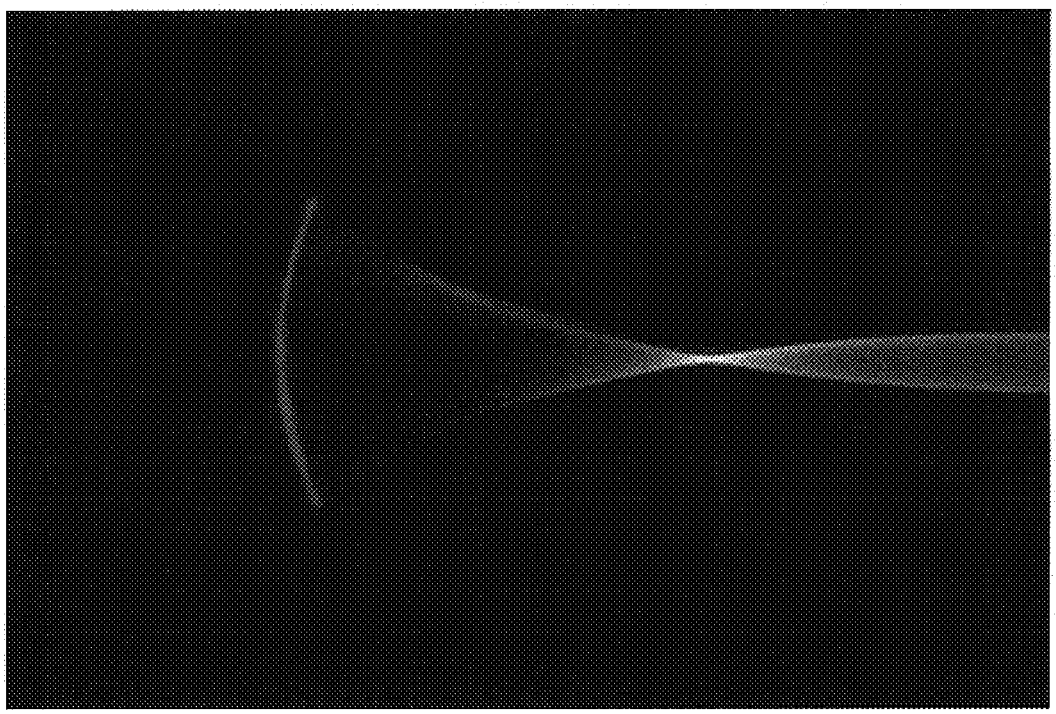
Figure 6:
Figure 8:
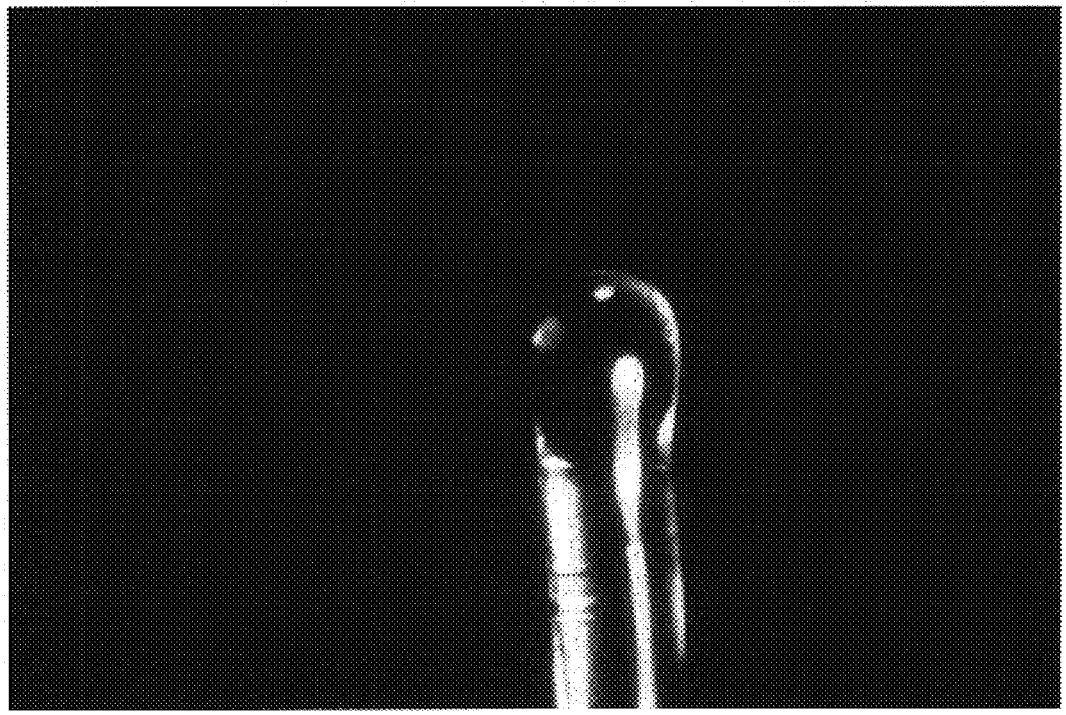
Figure 9:
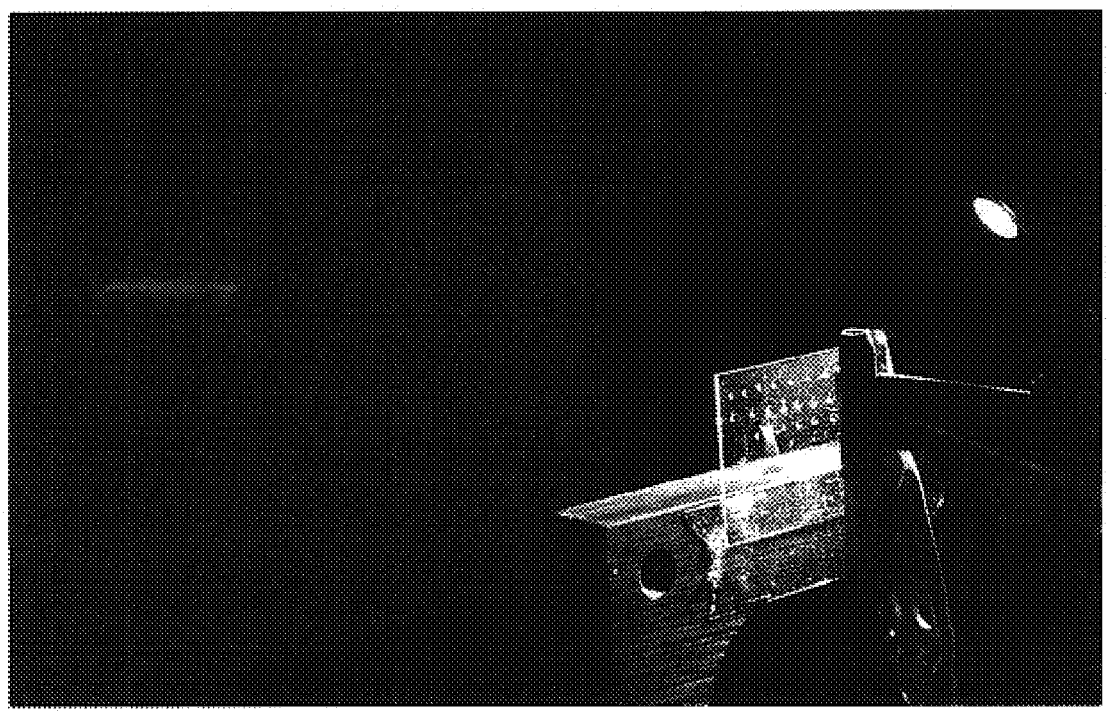
Figure 10A:
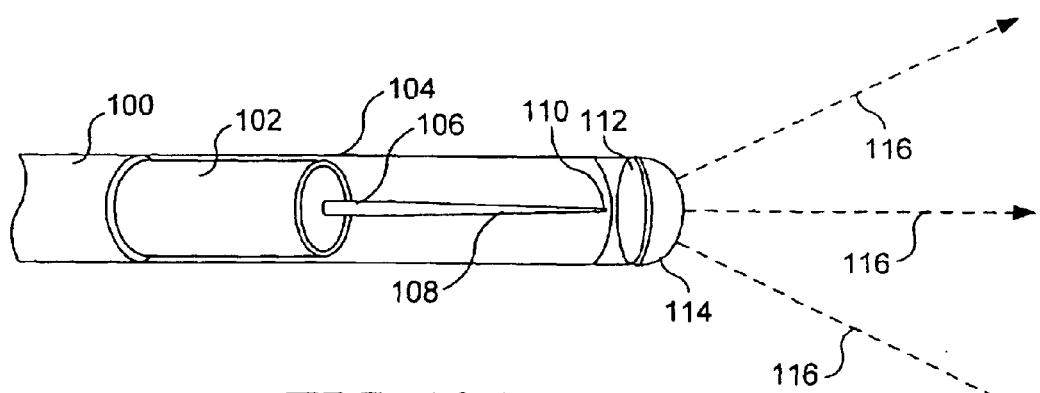
Figure 10B:
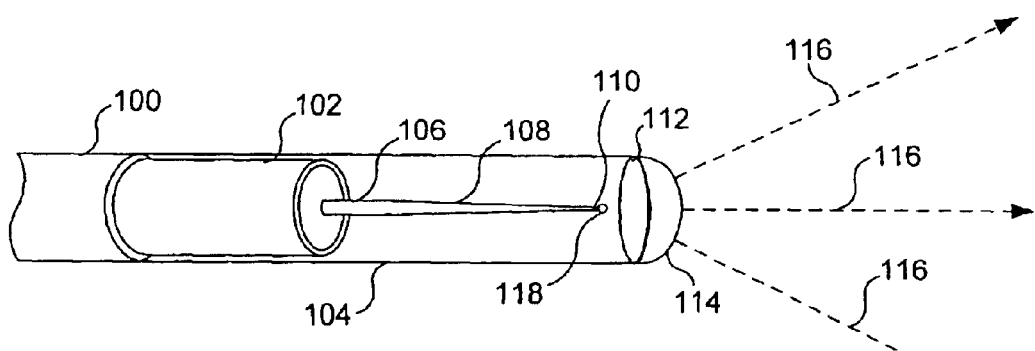
Figure 11A:
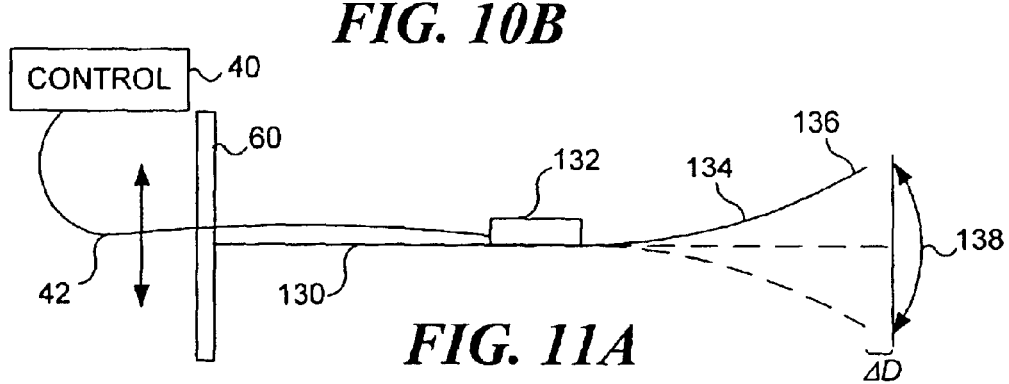
Figure 11B:
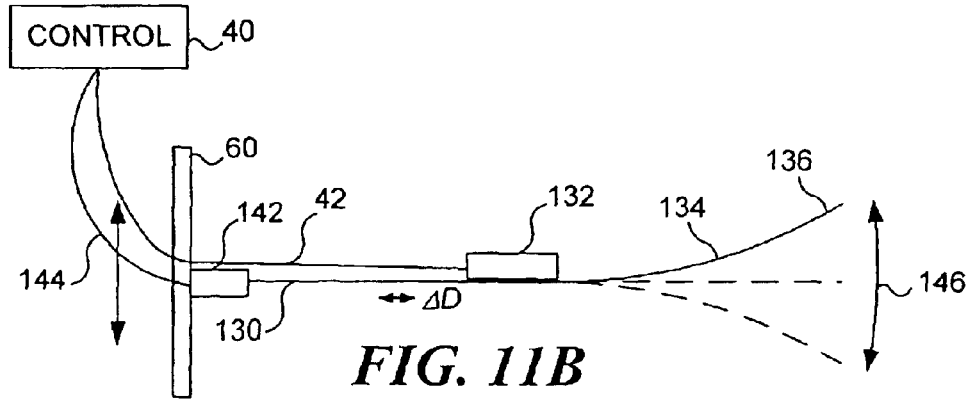
Figure 13:
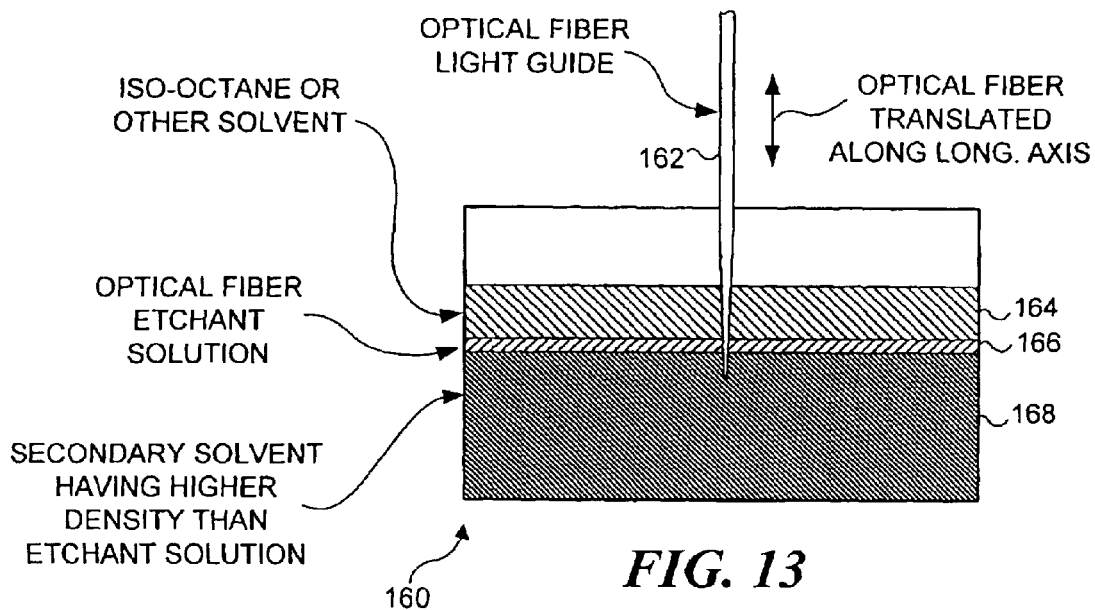
Figure 14A:
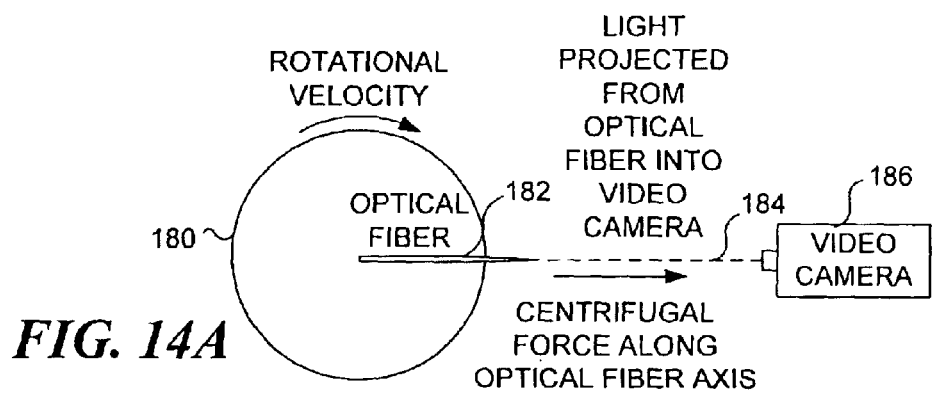
Figure 14B:
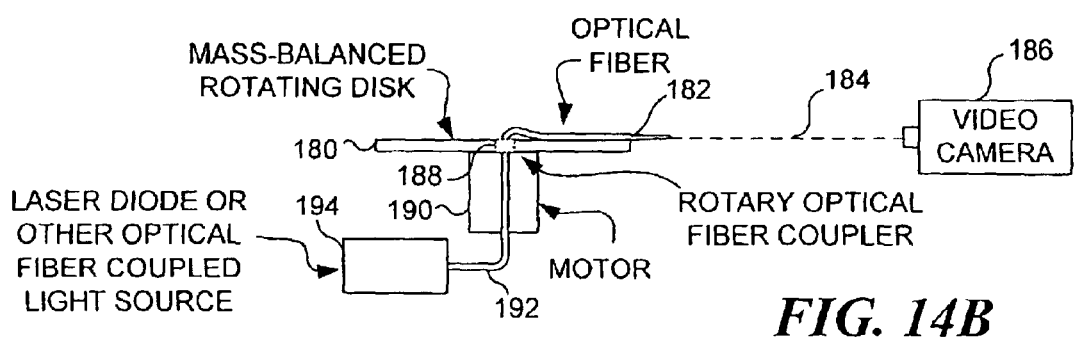
Figure 15A:
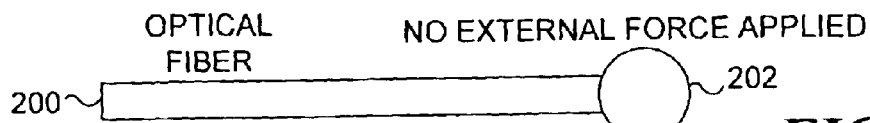
Figure 15B:
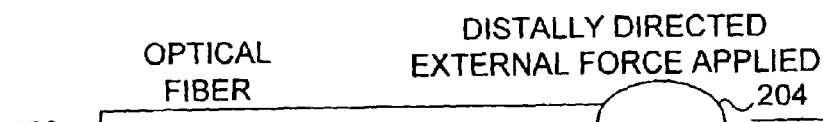
Figure 15C:
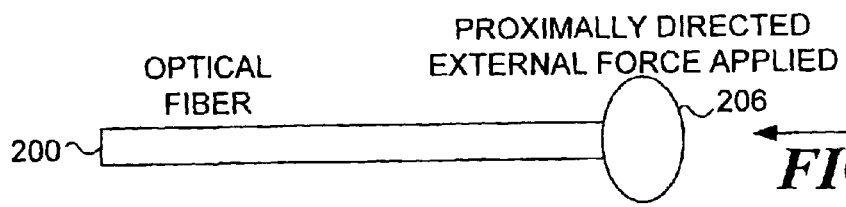
Figure 16:
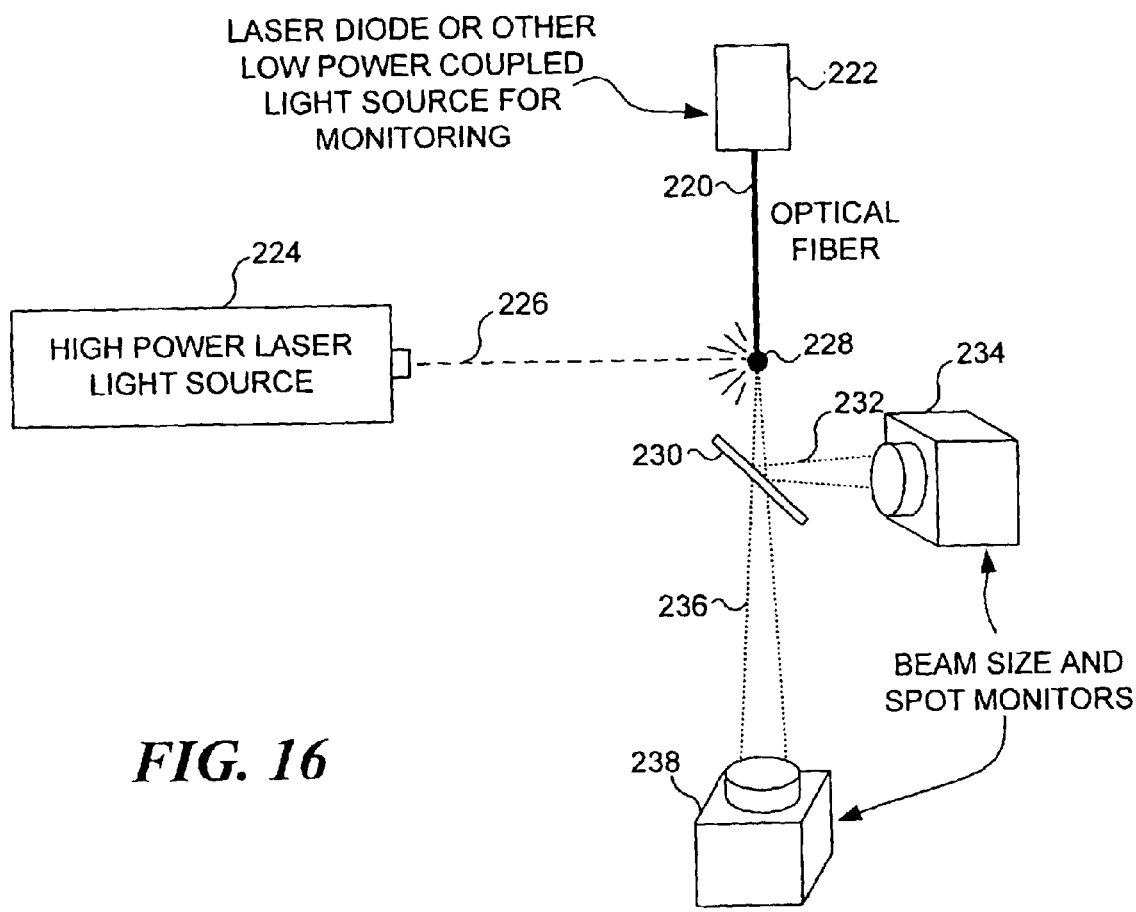
Figure 17:
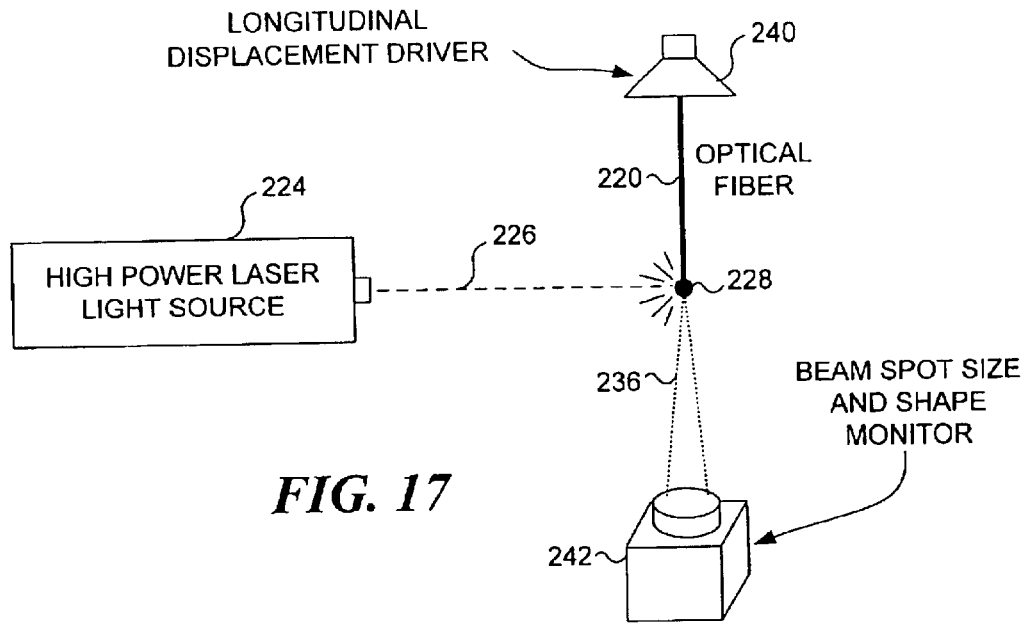
Figure 18:
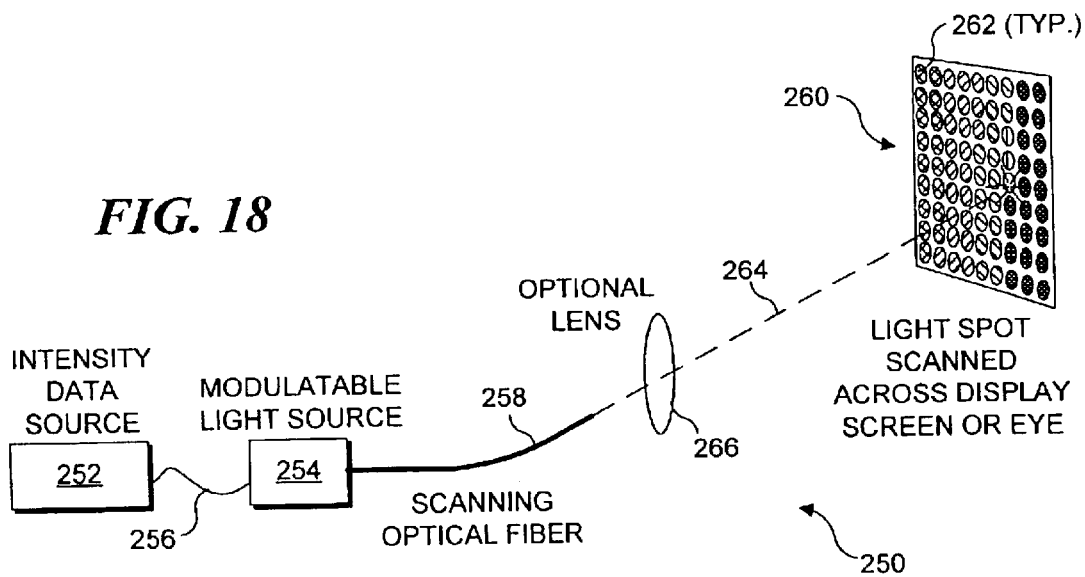
Figure 19:
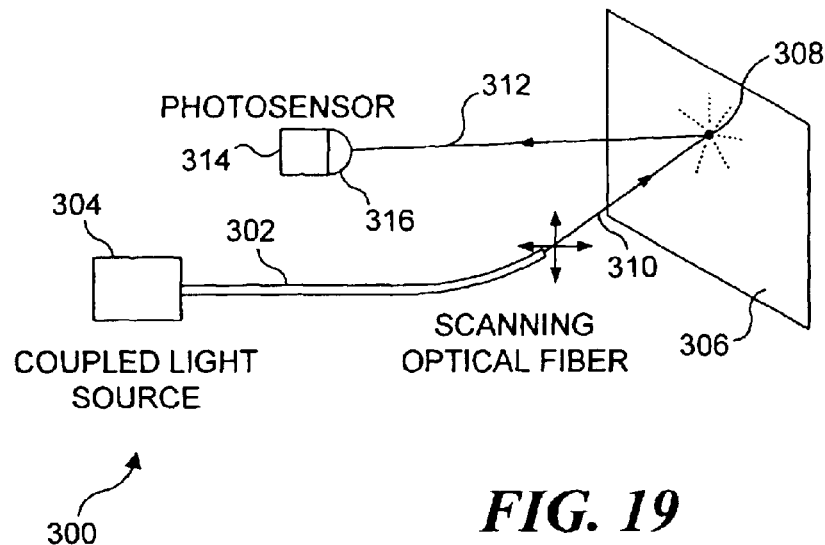
Figure 20A:
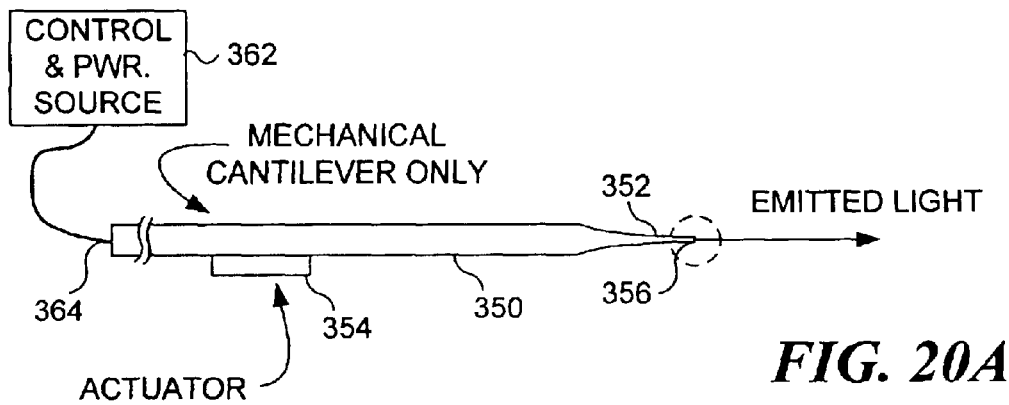
Figure 20B:
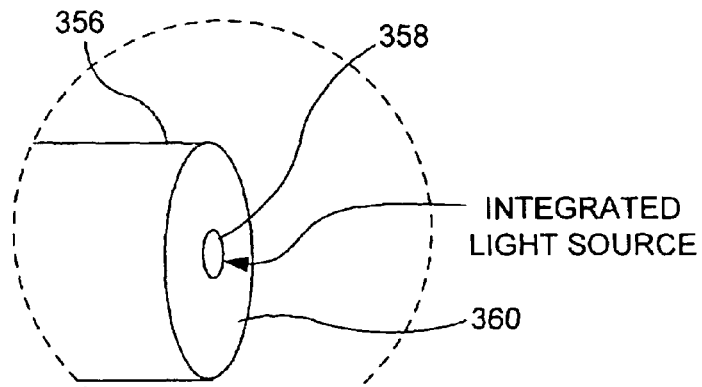

FIGS. 2A and 2B, respectively, are schematic views of an optical fiber tapered along its longitudinal axis, and of an optical fiber having a modulated taper, with a hinged tip;

FIG. 2C illustrates the dual resonance motion of the tapered portion of the optical fiber and the distal end of the optical fiber that are coupled through a hinge portion;

FIG. 3 illustrates the optical fiber of FIG. 2B, showing the motion of the tip along its longitudinal axis;

FIG. 4 (Color Photo) is an enlarged photo of a microfabricated fiber having a tapered geometry of 0.12 mm at its right base and 0.01 mm at its tip, which is moving linearly, with ~80° FOV, at about a 40 kHz frequency;

FIG. 5 (Color Photo) is a close-up photo highlighting the vibratory node and the light emission from the optical fiber of FIG. 4;

FIG. 6 (Color Photo) is a photo showing another fiber scanner having a tip moving in a 2D space filling pattern (with ~180° vertical movement);

FIG. 7 is a schematic view of a micro-fiber scanner with a 0.25 mm lens at the scanning fiber tip and a 2.0 mm diameter scan lens for generating high resolution images, acquiring images, or sensing light from a surface;

FIG. 8 (Color Photo) is a photo showing a 0.125 mm diameter fiber scanner tip having an epoxy micro-lens fabricated on the tip;

FIG. 9 (Color Photo) illustrates the linear scan line displayed on a screen using the optical fiber scanner of FIGS. 1A, 1B, and 2A or 2B;

FIGS. 10A and 10B are schematic cross-sectional views showing a fiber scanner with two different lens arrangements on the micro-machined fiber optic tip;

FIGS. 11A and 11B are schematic views respectively showing a waveguide tip moving in a rounded arc pattern with only lateral actuation, and in a flattened arc pattern with both lateral and synchronized axial actuation;

FIGS. 12A and 12B respectively show a round cross-section of a first tapered optical fiber and an elliptical cross-section;

FIG. 13 is an elevational schematic diagram of a container that includes multiple layers of solutions, for producing a hinge section on a tapered optical fiber;

FIGS. 14A and 14B are schematic plan and elevational views of apparatus used for producing a micro-lens on a tapered optical fiber;

FIGS. 15A, 15B, and 15C respectively illustrate a micro-lens formed without applying an external force and micro-lenses formed by apply external forces distally and proximally of the end of the optical fiber;

FIG. 16 is an isometric schematic diagram of a system for forming a micro-lens using a laser to heat the distal tip of a tapered optical fiber;

FIG. 17 is an isometric schematic diagram similar to that of FIG. 16, illustrating an alternative approach for applying a force along a longitudinal axis of the optical fiber while forming the micro-lens;

FIG. 18 is a schematic block diagram of a display system employing the present invention;

FIG. 19 is a schematic block diagram of an imaging system employing the present invention; and FIGS. 20A and 20B are respectively a side elevational view of a mechanical structure having a tapered tip that is caused to scan, and a greatly enlarged isometric view of the distal end of the mechanical structure of FIG. 20A, showing an integrated light source on the distal end.

DESCRIPTION OF THE PREFERRED EMBODIMENT

An alternative method of optical scanning at both high amplitudes (FOVs) and frequencies has been experimentally verified. This new method scans a micro-fabricated optical waveguide (not a mirror), at a mechanical or vibratory resonance. As shown in FIGS. 1A and 1B, a waveguide 20 is typically formed in a fixed-free cantilever configuration, with a distal (free) tip 24 swinging at a near resonant amplitude from an extreme displacement in one direction as shown by the solid lines in FIGS. 1A and 1B, to an extreme displacement in an opposite direction as shown by the dash lines and as indicated by the prime reference numbers (e.g., distal tip 24'). Arc 26 is proportional to the optical FOV for the linear scan. A micro-fabricated region 22 of waveguide 20 is typically 0.50 to 2.0 mm in length, with a cross-sectional diameter nonlinearly tapering from about 0.1 to 0.01 mm (as shown most clearly in FIG. 2A). However, the tapered geometry can be fabricated nonuniformly for special scanning features (see light guide 50 in FIGS. 2B, 2C, and 3). Also, an optical fiber can be formed that is axially asymmetrical, to achieve different scanning parameters about different axes. Optical fibers with a round cross-section 150 as shown in FIG. 12A, will have substantially the same resonance characteristics about any two orthogonal axes extending through the cross-section. In contrast, optical fibers having an elliptical cross-section 152 as shown in FIG. 12B will have different resonant frequencies about two orthogonal axes aligned with the major and minor axes of the elliptical cross-section, since there will be greater resistance to flexing about the minor axis than about the major axis.

The scanning micro-fabricated waveguide has a much smaller mass, inertia, and viscous drag than a scanning MEMS mirror that is 1 mm square (not shown). Furthermore, the optical surface of the waveguide is typically less than 10 microns in diameter (at the distal tip), versus MEMS mirror sizes that are at least 50 to 100 times larger. Due to the smaller size of the optical surface on a resonant scanning waveguide relative to the planar mirror surface of resonant mirror scanners, the deterioration of the optical surface is expected to be slower, and the lifetime of the waveguide scanner in accord with the present invention is expected to be longer.

Initial prototypes of the resonant waveguide optical scanner have already demonstrated linear scan patterns at 80° FOV and at 40 kHz scan frequencies, with continuous operation for 72 hours (see FIGS. 4 and 5). Circular 2D scan patterns of over 100° FOV and space-filling 2D scan patterns of up to 180° FOV have been demonstrated at over 20 kHz scan frequencies (see FIG. 6). The geometry of the resonant waveguide scanner is preferably cylindrical, which is an ideal aspect ratio for mounting within spectacle frames for micro-displays and within slender tubes for micro-image acquisition systems (endoscopes and borescopes). Prototype optical fiber scan systems are expected to be no greater than 2 mm in diameter, which is the diameter of a scan lens 72 shown in FIG. 7 and of imaging lenses 112 and 114 shown in FIGS. 10A and 10B.

In addition to its ultrathin diameter, another major advantage of the micro-fabricated optical waveguide over mirror-based resonant optical scanners is its simplicity of design, fabrication, and assembly/packaging. Thus, the resonant waveguide optical scanner is extremely low cost in both fabrication and material unit costs. The multiple actuators that drive a mirror-based system are complex in design and fabrication, while only a single, inexpensive actuator is needed to drive a scanning optical fiber waveguide into its resonant scanning patterns. In addition, a mirror scanner has the disadvantage of requiring optical alignment with the illuminating light source or optical fiber, while a scanning waveguide can be micro-fabricated at the end of an optical fiber. Additional optical coupling and alignment are unnecessary.

Finally, a micro-fabricated waveguide scanner can be modified to include an integrated micro-optical lens for specific optical scanning applications. For example, high-resolution optical scanning may be achieved with a microlens 118 attached directly to the distal end of the waveguide scanner, as shown in FIG. 10B. A micro-lens made from ultraviolet-(UV) cured optical adhesive (epoxy) can be fabricated and firmly attached to the tip of the scanning waveguide. FIG. 7 schematically illustrates a 0.25 mm micro-lens (a ball lens 70) and shows light rays 76 emitted through this ball lens focused by imaging lens 72 onto a surface 74.

Examples of a micro-lens formed from spinning a droplet of UV-cured (or heat cured) optical adhesive, for example, an epoxy or other polymer, attached to an optical fiber are shown in FIG. 8, and are shown as drops on a glass slide in FIG. 9. The micro-lens both collimates the emerging optical beam and adds mass to the distal tip. At modes of resonance greater than the fundamental, the added mass moves the vibratory node very close to the distal tip of the optical fiber waveguide. The vibratory node then acts as an effective point source of light that is simply rotated by the angular deflection of the micro-lens.

The vibratory node achieved with the micro-lens is similar to that provided by a micro-fabricated "hinge" section 54 shown on nonlinear tapered optical fiber light guide 50 in FIGS. 2B, 2C, and 3, for use in both linear and 2D scan patterns. In light guide 50, a proximal nonlinear tapered portion 52 is reduced in cross-sectional diameter toward the distal end, but is necked-down to a substantially smaller diameter at hinge section 54. Following hinge section 54, a distal nonlinear tapered portion 56 first increases in diameter and then continues to decrease in size along a nonlinear taper toward a relatively small diameter distal tip 58. The hinged section increases angular and positional displacement of the tip when the optical fiber is driven by an actuator. If the section near the tip is kept significantly more rigid than the hinge region, then the relationship between tip angle (and thus, the exit angle of light from the distal tip of the optical fiber) and drive function is maintained in a linear relationship. The light emitted from the distal tip of the optical fiber also appears to come from a fixed point (i.e., from a fixed "optical node"), which simplifies external lens design—if such lenses are used.

Hinge section 54 can be formed using the technique schematically illustrated in FIG. 13, which provides for etching an optical fiber light guide 162 in a container 160 holding multiple layers of solutions. These solutions include a top layer 164 of iso-octane or other solvent, a middle layer 166 of a suitable optical fiber etchant solution, and a bottom layer 168 of a secondary solvent. The uppermost and lowermost solution layers are thus both organic solvents or other non-etchant solutions that are not miscible with the etchant solution. The density of the uppermost solvent layer must be less than that of the etchant solution, while the density of the lowermost secondary solvent layer must be greater than that of the etchant solution. As shown in FIG. 13, by creating a thin layer of etchant solution suspended between two organic solvents, the immersed fiber can be etched to create the hinge section or other desired profile shape, in which the cross-sectional diameter can increase and decrease selectively along the optical fiber longitudinal axis.

Alternatively, the optical fiber can be immersed in baths that contain gradients of pH, acid concentration, or solute diffusion coefficients. The etching process can be optionally influenced by confining the waveguide in a tube or other physical barrier that affects the etching rates axially and laterally along the waveguide. The method of etching can be modified to include flowing liquid acids or other solvents or vapors or abrasives that may vary in concentration or flow rate during the etching process. Also, the optical fiber can be coated with a layer that may be a graded or predetermined pattern of protection from etching, such as a layer of photoresist that has been exposed differentially to polymerization.

The above techniques can thus be used to produce an optical fiber having two or more distinct sections of differing radii, so that each section has an independently determinable length. The resulting optical fiber can be made to have two or more distinct resonances. Thus, separate resonances can be created for raster scanning, where one resonance corresponds to a horizontal scan rate, and another different resonance corresponds to a vertical scan rate.

FIG. 3 illustrates a node 64 that is developed relative to a fixed reference 60, as the light guide is driven toward a resonant condition by an actuator (not shown). Arcs 62 and 62' are apparent in the proximal nonlinear portion of the light guide, while the distal tip moves in an arc between extremes 66 and 66'. FIG. 2C illustrates that different resonant frequencies can be developed for proximal nonlinear tapered portion 52 and for distal nonlinear tapered portion 56, as each portion describes arcs 62 and 62', respectively.

In U.S. Pat. No. 5,727,098, Jacobson has described and claimed an oscillating and resonant scanning optical fiber with a modulated light source at the proximal end with synchronized actuators at the distal end to project an image as a visual display. However, there is no reference to any micro-fabrication of an optical fiber or custom waveguide with optimized optical or mechanical properties. Furthermore, Jacobson does not disclose any micro-optical fabrication of micro-lenses or electronic feedback control strategies like those used in the present invention. The prior art discloses an optical fiber that is linearly tapered, and only used within a near-field scanning optical microscope. In the copending application in which priority is claimed above, image acquisition using resonant scanning of an optical fiber is disclosed in regards to medical applications of the present invention; however, it must be emphasized that the present invention is not limited to such applications.

Fabrication

The initial fabrication method used to taper commercial optical fibers is based on heating the silica glass and pulling it to taper and eventually break the optical fiber at roughly 5 to 20 microns in tip diameter. The "fiber puller" is a commercial quartz pipette puller (available as Model P-2000 from Sutter Instrument Co.) with special holders for optical fibers having 0.125 mm cladding diameter. The optical fiber puller uses a $CO_2$ laser emission to heat the optical fiber quickly and uniformly, while forceful pulling occurs at a pre-programmed time after the silica fiber softens and starts to yield under low tensile stress (gravity). The P-2000 single-line computer program used to fabricate the tapered optical fiber scanners in FIGS. 4–6 has the following values: Laser Heat=900, Filament=4, Trip-Velocity=240, Delay Time=250, and Pull Force=60. This program employs only a single pulling step that generates the general tapered profile; however, much more complex shapes can be generated by using a multi-step pulling process. Before the optical fiber is loaded onto the "fiber puller," the plastic buffer is removed by mechanically stripping and wiping away residual plastic debris. The remainder of the optical fiber (extending as approximately a 1 meter "pigtail") retains its plastic buffering and is connected to an optical light source (typically one or more lasers) via an optical fiber coupling mechanism (e.g., an Ultrasplice, from ACA Inc.).

The heating and pulling method employed for micro-fabrication of tapered waveguides has been applied in the prior art to silica, single-mode optical fibers for the purpose of making probes for near-field scanning optical microscopes. However, the general method can be applied to non-silica glass fibers, hollow fibers, and non-glass optical fibers, such as plastic fibers using radiant heating. The advantages of this pulling method is that it has been well established for fabricating tapered optical fibers for scanning probe optical microscopes. The tapered tip of the waveguide can be made much smaller (less than about 5 microns) than the core diameter of the optical fiber, generating a smaller point source of light. The reduction in source size can increase the spatial resolution of the scanned light projection display or in applications of optical sensing or image acquisition. Typically, the sides of the tapered waveguide are coated with a reflecting material such as aluminum to prevent light from leaking out the sides before reaching the distal tip.

A second alternative fabrication method uses acid etching and/or mechanical polishing of the silica or glass optical fiber or waveguide. In contrast to the previous heating and pulling fabrication method, in the alternative method, the waveguide is tapered by first removing material from the radial extremity. Thus, the waveguide core can be preserved, while still providing the degree of tapering necessary for the specifications of high scan amplitudes and frequencies required.

The most common method for tapering silica and glass optical fibers is acid etching, typically with an aqueous solution of hydrofluoric (HF) acid. The most straightforward technique for controlling the tapered profile is by immersing the distal end of an optical fiber (protective plastic buffering removed) in HF acid and slowly withdrawing the optical fiber at a pre-programmed rate. Again, the methods for reproducibly tapering optical fibers (silica and plastic) has been developed in the prior art by users of scanning probe optical microscopes. However, both the tapered profile and performance requirements for the scanned probe microscopes (i.e., short conical tapers) are very different from those of micro-fabricated fiber scanners (i.e., exponentially decreasing tapers). Additional procedures for the micro-fabrication of tapered waveguides and optical fibers are described herein.

After the tapered end of the optical fiber or waveguide is fabricated, the surface of the uniform tapered geometry can be smoothed by polishing or modified into an axially asymmetric profile (see FIG. 12B). Micro-beveling devices can be used to polish the distal tip, trim the tapered profile, and optionally, to reduce the structural rigidity at discrete points, such as adding hinge section 54, as shown in FIGS. 2B, 2C, and 3. Micro-beveling and micro-polishing devices are commercially available and recently have been used to trim sub-micron-sized tips of tapered optical probes for scanned optical microscopes.

Using a waveguide that is micro-fabricated as described above to have specific desired surface properties and waveguide geometry, the micro-fabricated waveguide can be used in a scanning system in which it is vibrated at one or more frequencies by an actuator. If one of these frequencies corresponds to a mechanical resonance of the waveguide, then an amplification of the waveguide motion ensues.

In prototype assemblies, a tapered optical fiber was rigidly attached to piezoelectric bimorph benders 28 (see FIGS. 1A, 1B, 2A, and 2B) or a piezo tube 36 (see FIG. 1C) with quadrant electrodes by either gluing or mechanically clamping. For example, a tapered portion 108 of an optical fiber 106 is attached to the distal end of a piezoelectric actuator 102, close to the proximal end of the taper, as shown in FIGS. 10A and 10B. The exact point of attachment, mechanical properties of the waveguide, and taper geometry determine the resonance frequencies of the optical fiber scanner. The actuation amplitude and frequency of the piezoelectric actuator determine the amplitudes of optical fiber displacement and deflection of a distal tip 110 (shown in FIGS. 10A and 10B), its frequency, and the optical scanning pattern it describes. Typically, an optical fiber cantilever is extended from about 1 to about 4 mm out from its point of attachment at the end of the piezoelectric bimorph to achieve high FOV scanning frequencies of greater than 20 kHz. The opposite end of the piezoelectric actuator is held fixed (e.g., epoxied to the end of a steel tube 100). Thus, both the micro-fabricated optical fiber and the actuator are cantilevered in a fixed-free boundary condition. A protective tube 104 surrounds the optical fiber and the actuator. At the fixed end, piezoelectric electrodes (not shown in FIG. 10A or 10B) on the actuator are connected by fine wires (also not shown) to an electronic function generator included in control 40 (shown in FIG. 11A) that can produce a sinusoidal waveform of variable voltage (amplitude) at a desired frequency (adjustable from about 1 kHz to about 100 kHz). To produce greater electromechanical gain (higher piezo actuation) for the same voltage and frequency, the actuator can be shaped to have a mechanical resonance that is close in frequency to that of micro-fabricated light guide 50.

Separate imaging and/or scan lenses 112 and 114 can be disposed adjacent to the tip of the micro-fabricated fiber scanner to generate focused linear and 2D scan patterns onto a screen, as shown in FIG. 9, and FIGS. 10A and 10B. Furthermore, a micro-lens 118 can be fabricated onto distal tip 110 of optical fiber 106, as shown in FIG. 10B. A photograph of such a micro-lens is reproduced in FIG. 8.

The micro-lens can be formed on the micro-fabricated optical fiber cantilever by the following procedure, which is schematically illustrated in FIGS. 14A and 14B. In this method, the lens material is a UV-cured optical adhesive administered to a separate substrate (FIG. 9) or to an optical fiber waveguide (FIG. 8). The added fabrication step of attaching a micro-lens at waveguide distal tip 110 helps to simplify the secondary lens system (imaging and/or scan lenses 112 and 114).

The micro-lens formed at the distal tip of an optical fiber can be shaped by the centrifugal forces resulting from spinning an optical fiber 182 in a circular movement on a mass-balanced rotating disk 180, as shown in FIGS. 14A and 14B. In addition to the speed of spinning and the amount of optical adhesive, important factors are the optical fiber waveguide distal tip geometry and surface adhesion properties (hydrophobicity), viscosity, cured refractive index and shrinkage, and surface tension (adhesion) of the optical adhesive, which can be varied to produce micro-lenses of desired opto-mechanical properties. An electric motor 190 rotates disk 180, which includes an optical fiber rotary joint 188 at its center. The optical fiber is mounted on the rotating disk with its tapered end facing radially outward. A small drop of optical adhesive (too small to be seen in the figures) is admitted manually with a micropipette to the tapered portion near the optical fiber tip. Inspection of the droplet is done under 80× magnification, while the optical fiber pigtail is coupled to a laser diode or other light source 194 through an optical fiber 192, illuminating the tapered tip and droplet of optical adhesive with light 184 that is emitted from the distal tip of optical fiber 182. Motor 190 is started, causing the disk to rotate, and real-time evaluation of the collimated and/or focusing light emission from the droplet of optical adhesive is monitored with a video camera 186. Optionally, a strobe light (not shown) is synchronized with the rotating disk so that the profile of the droplet shape may be checked during spinning. After the droplet and optical beam profiles have been adjusted properly, a UV lamp (not shown) is turned on to cure the optical adhesive droplet. In addition, the process of UV-curing and hardening the micro-lens can be controlled while monitoring the optical beam profile as the micro-fabricated optical fiber is spinning. The entire apparatus may be placed in a vacuum chamber to reduce frictional forces due to air drag that tend to asymmetrically distort the shape of the lens.

Instead of applying a droplet of an optical adhesive to the distal tip of an optical fiber to form a micro-lens, it is possible to form the micro-lens from the material comprising the optical fiber. In this process, which is illustrated in FIG. 16, the distal tip of an optical fiber 220 is positioned within a focused beam path 226 of a high power laser light source 224 (e.g., a Synrad Inc. 25 W laser with 370 mm focal length lens). The optical fiber material (silica glass) is heated locally with the coherent light from the laser to a sufficiently high temperatures to melt, achieving a low viscosity state. At this point, the molten glass forms a droplet 228. The shape of droplet 228 is primarily determined by surface tension forces and the viscosity of the molten glass. Preferentially, the optical fiber is oriented vertically so that the force due to gravity does not distort the lens shape in an asymmetrical manner. Using a relatively low power laser diode or other low power light source 222 coupled into the optical fiber that is undergoing lens formation, the lens characteristics can be monitored in real time. Monitors 234 and 238 are used with optional lenses (not shown) to measure the beam spot shape and size. Multiple point measurements along beam paths 232 and 236 are made with the monitors by employing a beam splitter 230 to sample beam spot size and shape at two distances from the optical fiber distal tip, enabling more accurate estimation of the divergence/convergence angle of the light exiting the micro-lens comprising droplet 228.

A second method for shaping the micro-lens to achieve desired optical characteristics uses an air flow in a directed manner to apply a force to the lens material while it remains in a low-viscosity state. This force is preferably applied uniformly and symmetrically about the axis of the optical fiber. The air temperature surrounding the optical fiber may be controlled so that the air does not cause significant changes in the desired viscosity of the lens during the lens formation process.

As an alternative to using centrifugal force or air flow to apply an external lens-shaping force to the micro-lens, the required force can be applied by moving optical fiber 220 along its axis during lens formation. For example, as shown in FIG. 17, a longitudinal displacement driver 240 can be employed to accelerate the fiber axially. During the acceleration of the optical fiber along its longitudinal axis, high power laser light source 224 is pulsed to strike the distal tip of the optical fiber, again forming droplet 228 by melting the glass comprising the optical fiber. The glass remains in a molten state for a short time period, during which the axial acceleration force causes reshaping of the lens. This method for lens shaping using the laser-induced melting of the fiber is preferred, since it readily enables a feedback control scheme to be employed in controlling the optical parameters of the micro-lens that is being formed.

Force applied to the droplet as a result of centrifugal force, or the axial force applied with a driver (or with a pressurized air flow (not shown)) while the micro-lens is being cured affects the resulting shape, the position relative to the effective light source, and optical properties of the micro-lens. Ignoring capillary force effects, FIGS. 15A, 15B, and 15C respectively show an optical fiber 200 on which a micro-lens 202 is formed without applying any force, a micro-lens 204 formed while applying a distally directed force, and a micro-lens 206 formed by applying a proximally directed force. The direction of the force can be controlled by varying the manner in which the optical fiber is mounted on the rotating disk (to vary the direction of centrifugal force acting on the droplet comprising the micro-lens), and the magnitude of the force can be controlled by varying the rotational speed of the disk. Alternatively, the current applied to the longitudinal displacement driver can be controlled to vary the direction and amplitude of the force.

Detecting the Position/Movement of the Scanning Waveguide

Knowing the optical fiber waveguide tip position and/or velocity and orientation at all times guarantees that all the pixels of an image, displayed or acquired, will be accurately positioned in both time and space. Sensors to detect the relative position of the waveguide are incorporated in a post waveguide and micro-lens fabrication step. One embodiment uses electromechanical sensors, such as thin-film, flexible piezoelectric films on the sides of the scanning waveguide. As the sides of the waveguide bend, the individual sensors undergo cycles of either tensile or compressive stress, producing either positive or negative voltage output signals. These piezoelectric sensors can be deposited onto the side of the waveguide by adhering thin piezoelectric films or by conventional thin-film deposition techniques, using masking, etching, or cutting to generate sensors on each of the four quadrants or sides of the waveguide. FIGS. 1A, 1B, 2A, and 2B schematically illustrate sensors 30 overlying piezoelectric bimorph actuators 28, but it will be appreciated that the sensors are mounted separately from the actuators. The piezoelectric bimorph actuators and the sensors are coupled to a control 40 by leads 42.

A second embodiment employs an optical source producing radiation at a wavelength not being used for the scanner application (e.g., infrared (IR) lasers or light emitting diodes (LEDs)) and matching IR detectors (IR photodiodes) to monitor the direction of the scanning waveguide. Sensors 30 in FIGS. 1A, 1B, 2A, and 2B correspond to these optical sensors in this embodiment. Details of exemplary sensors suitable for this purpose are disclosed in the priority parent patent application referenced above. Both the light sources and detectors are preferably made from diode material that can be positioned at either the distal or proximal end or the micro-fabricated fiber scanner. If the diode material is disposed at the proximal end, then the diodes will send and receive light to and from the distal tip using optical fibers running with the scanning optical waveguide. If disposed instead at the distal end, then the diodes may be positioned to detect an IR beam (or other waveband of light that is being used) as it reflects from the scanning waveguide or to detect its shadow in transmission. Since the motion of the waveguide is directly related to the motion of the IR beam, the optical detectors will be spatially arranged to detect differential amounts of light depending on the disposition of the IR beam. This optical detection method is routinely used to measure the relative motion of vibrating waveguides within scanning probe microscopes. In both embodiments, differential signals from the multiple sensors (piezoelectric thin films attached to the sides of the waveguide or optical detectors attached to the inside walls of the waveguide enclosure) will be used to determine the real-time position of the scanned waveguide.

Operation

The operation of an optical scanner micro-fabricated from a tapered optical fiber waveguide is similar to an optical scanner based on a mirror, in that the position of the resulting optical beam is a direct function of the position over time of the moving tapered fiber or mirror. However, as mentioned before, the connection and alignment with the optical source or illuminating optical fibers is a simple and robust fiber-to-fiber connection in the present invention, resulting in more than about 90 percent coupling efficiency. In contrast, mirror-based optical scanners must have packaging that can maintain alignment and precise dimensional stability of a more complex optical system of an optical fiber holder and lenses and also have the problems of multiple reflections and stray light.

In operation, a piezoelectric bimorph and a tube actuator can accomplish the same function, in the present invention. By applying an oscillating voltage to either piezoelectric material, the base of the micro-fabricated cantilever waveguide is moved. Although the bimorph is a 1D actuator and the tube is a 2D or three-dimensional (3D) actuator, two piezoelectric bimorph actuators 28 can be assembled to create 2D actuation, as shown in FIGS. 1B, 2A, and 2B. Two-dimensional actuation can produce resonant or non-resonant linear motion in two dimensions, and in several scanning patterns, including: a linear scan 26 (used in a rectilinear or raster pattern) as shown in FIG. 1A; a FOV 32 that is in a circular pattern 32 or spiral pattern 37 as shown in FIGS. 1B and 1C, respectively; a rotating linear or propeller scan pattern 38 as shown in FIG. 1D; and other Lissajous patterns (not specifically shown, but readily derived by applying an appropriate drive signal to actuator 36 in FIG. 1C). Furthermore, due to the nonlinear resonant behavior of the optical waveguide, 1D actuation can produce well-defined 2D patterns and also space-filling scanning motions (e.g., beating or chaotic motion), as shown in FIG. 6.

The present invention is clearly applicable to both image scanning and display systems. FIG. 18 schematically illustrates an exemplary scanning optical fiber display system 250 in accord with the present invention. In this system, an intensity data source 252, such a video signal from a computer or other video source, is supplied through a lead 256 as a modulated input signal to a modulatable light source 254. Also, in a display system, the 2D position of the scanned spot or scanner can be measured and the desired pixel brightness at that location found by accessing a look-up table. In response to the modulated input signal, the light source provides modulated light that is input to the proximal end of a scanning optical fiber 258, which is driven in a desired scanning pattern.

The scan does not need to be a periodic or repeatable scan. As long as the scan is space-filling within the duration of a frame, a complete coherent image will be formed. The modulated light emitted from the distal end of the scanning optical fiber is directed along a path 264 to a display screen 260 (or directly into a user's eye and onto the retina of the eye (not shown)). The scanning optical fiber scans the modulated light across the display screen or eye of the user, producing an array of modulated intensity light spots 262 (or pixels), each spot having an intensity as determined by the modulated input signal. Accordingly, an image is formed comprising the light spots 262. Optionally, one or more lenses 266 can be provided to ensure that the light emitted from the distal tip of the scanning optical fiber is directed and focused on each point in the array. It will be apparent that a separate light source can be included for each of a plurality of different colored modulatable light sources (e.g., red, green, and blue lasers), so that a color image can be created by combining the modulated light from the three different color sources to produce each light spot. The output optical beams from the three light sources can be coupled into a single optical fiber or into separate optical fibers that are optically combined before being connected to the optical fiber pigtail of the micro-fabricated fiber scanner.

To display a scanned optical image consisting of a 2D array of pixels, each pixel must have a specific location, which relates to the position and orientation of the micro-fabricated fiber scanner. At each pixel location, the optical intensity value must be re-displayed at the refresh rate, typically 60 Hz to avoid a noticeable flicker. Thus, within 1/60 second, the optical fiber scanner must move through every pixel location in the 2D image.

The 2D scan pattern can be generated and refreshed at 60 Hz in one of several ways. A high-frequency linear scan can be swept back and forth at 30 Hz, or a circular scan line can be enlarged and constricted repeatedly in a spiral at 30 Hz, or a high frequency linear scan can be rotated like a propeller blade. For example, a sVGA display of 800×600 pixels will require a 20 kHz bidirectional line scan that can be swept back and forth at 30 to 60 Hz. Once the 2D scan pattern can be reproduced at sufficient frequency and FOV, the laser sources are modulated synchronously with the scanning actuators to produce the correct color and intensity at each of the 800×600 pixel locations.

FIG. 19 schematically illustrates an exemplary 2D scanning optical fiber image acquisition system 300 employing the present invention. In the image scanner system, a tapered scanning optical fiber 302 is caused to move relative to the two orthogonal directions indicated in the figure to scan a surface 306. It should be understood that surface 306 need not be planar, but instead, can be irregular or curved. A coupled light source 304 at the proximal end of the tapered scanning optical fiber provides light that is conveyed through the optical fiber and emitted from the distal tip of the optical fiber so that the light travels along a path 310 and strikes surface 306 at a point 308. Light scattered or reflected from point 308 travels back along a path 312 to a photosensor 314, which produces a signal that can be processed and analyzed or used for producing an image of surface 306. An optional light collection lens 316 is provided on photosensor 314. An image is produced if successive points on the surface are similarly scanned with light from the distal tip of the optical fiber. A buffer (not shown) can be used to store the signal from photosensor, and a raster output from the buffer used to drive a display to provide the image of the surface. Clearly, it should be understood that FIG. 19 is a very simplistic illustration and that many variations of this technique can employ the present invention to carry out related functions. For example, surface 306 might comprise a barcode that is scanned with an optical fiber actuated to scan in only a single dimension. Also, a waveband of the light source used to image the surface can be selected to detect specific characteristics of the surface being scanned.

In an image acquisition application, the light source is not electronically modulated to create sampled or pixilated images. Typically, the illuminated object has sufficient optical contrast (variable absorption, scattering, and topography) to modulate the backscattered and reflected light. Optionally, additional photon detectors are required to measure and temporally record the optical signal, which is synchronized with the waveguide position and displayed and/or stored accordingly. The above-noted priority copending patent application describes several embodiments and applications of scanned waveguide image acquisition systems. In all cases, it is interesting to note that the size of the optical detectors do not determine the resolution of the acquired image.

To acquire (or display) a coherent image, the samples (or pixels) must be recorded to (or output from) a buffer synchronized to the scanned light spot location or equivalently, to the scanner (optical fiber tip and/or mirror) position. For example, in a raster display, it is important to start producing an output from the frame buffer when the scan is in the upper-left corner. In an acquisition system, the 2D position of the scanned spot or scanner can be measured at the same moment the intensity of the back scattered light is measured with a photo detector. A time record of the position and intensity can be kept for each pixel. For each frame, after a sufficient time has elapsed, an image can be formed by taking the record of the position and intensity acquired for all the pixels that produce an image frame (an intensity map image). As was true in the display system, the scan in an image acquisition system does not need to be periodic or repeatable. As long as the scan is space-filling within the duration of a frame, a complete coherent image will be captured.

Scanning Cantilevered Mechanical Structure

The present invention can also be applied to a tapered cantilevered structure 350 having a tapered portion 352 that is reduced in diameter to a distal end 356. This embodiment is usable for image display on a surface (or in a user's eye), or for image acquisition in conjunction with one or more photodetectors (not shown). However, unlike the other embodiments, structure 350 need not be made of a material that is able to convey light or other electromagnetic energy, i.e., the structure need not be a waveguide for electromagnetic energy. An actuator 354 is energized to apply a driving force to structure 350, causing distal end 356 of the structure to scan in a desired pattern, e.g., as described above. A control and power supply 362 provides electrical current to actuator 354 through leads 364, which extend along the longitudinal axis of structure 350, and controls the actuator so as to achieve the desired pattern of scanning.

Integrally disposed (or otherwise attached) to a distal face 360 at distal end 356 of structure 350 is a light source 358. For example, a LED or other suitable light source energized with an electrical current that is also provided through leads 364 can be employed for this purpose. This light source emits light as the distal end moves in the desired scan pattern. The emitted light can be directed onto a surface (not shown) to illuminate the surface with the light in the desired pattern. It is also contemplated that other devices, such as a light sensor, might instead be integrally included or attached to distal face 360, where it is desirable to use the scanning structure to move the device relative to some surface or other object.

Electronic Feedback Control Systems

It is possible to use open loop control of a scanning waveguide by applying appropriate periodic drive signals (sinusoidal, square wave, etc.) to produce stable periodic scan patterns. Acquired illumination samples (or output pixels) are correlated to assumed positions of the scan based on the relative time from a periodic reference sync signal related to the start of the frame acquisition (or display). Manual adjustment of relative phases of the scanner's drive signals, buffer input (or output), and sync signal, will result in stable coherent image acquisition (or display). These phases may need to be changed when scan amplitudes are changed (e.g., zoomed), or if environmental changes affect the scanner.

When zooming, the driver amplitude is reduced to decrease the FOV. Due to nonlinear effects, the phase relation between the drive and the output is not constant. If not accounted for, either by manual adjustment or by a look-up table, the image will become incoherent. Environmental changes may cause the resonant frequency of the optical fiber to change, also resulting in a phase and amplitude shift. These shifts would have to be compensated by changing the amplitude and phase of the drive signals manually.

Manual adjustment of the phases can be replaced with a phase-locked loop (PLL). The PLL will use measurements related to the scanner or scan spot position, for example, monitoring the electric current through the piezoelectric tube, or direct measurement of the spot position. The PLL compares these measurements with the phase of a reference waveform, and adjusts the scanners drive signals so that the phase between the reference and the waveform from the sensor stay locked to each other regardless of changes due to internal dynamics or mechanics or external environmental effects. Similarly, the amplitude of the scan can be kept at a desired level (or possibly time-varying) by using an auto-gain control to keep the amplitude of a related periodic measurement from the scanner or scan spot position at the desired level. For automatically controlling gain, the PLL controller should have an additional PID amplitude control. An amplitude demodulator can be provided to determine the modulation envelope magnitude, and the additional PID amplitude control maintain a constant level for the envelope magnitude by adjusting an amplitude of the output signal from a voltage controlled oscillator (VCO) used to produce it (none of these components are shown).

The PLL can either change the frequency until the scanner response matches the phase, or can directly change the phase, keeping the frequency constant. The first approach, which involves changing the drive frequency until the response phase matches the reference phase, is useful for maintaining the scanner at the frequency of maximum displacement (e.g., resonance, which has a phase difference from input to output of 90°, in linear vibration theory) regardless of environmental changes or manufacturing variability. Because the drive frequency changes, the scanner determines how often a sample will be acquired or a pixel displayed. Therefore, the scanner becomes the master and the acquisition or display system becomes the slave. In the second approach, the frequency is constant, but the phase of the driver changes until the phase of the output matches that of the reference. The acquisition or display system is the master, and the scanner is the slave.

Alternatively, for sinusoidal scans, the amplitude and phase of the scanner output can be determined using a lock-in amplifier or sine wave parameter identification. A linear feedback loop adjusts the amplitude and phase of the sinusoidal drive signals to match the desired amplitude and phase. The frequency of the sinusoidal scan is the same frequency as the drive signal and the same frequency used in the lock-in amplifier. In this case, again, the scanner is the slave, and the acquisition or display system is the master.

Undesirable linear and/or nonlinear dynamic effects cannot be fully compensated for using a PLL and auto-gain control to control the phase and amplitude or using linear feedback of the phase and amplitude. Even robust linear control schemes (such as internal model integral state space schemes or classical proportional-integral-derivative (PID) or dynamic compensation with feed-forward for tracking) are not able to handle all of the nonlinear dynamics effects. However, these previously mentioned schemes can work for small amplitude displacements (low FOV) and/or low frame rates.

Ideally, a robust nonlinear control scheme for asymptotic tracking can be used to force the scan position (measured by the aforementioned sensors) to follow a reference waveform regardless of manufacturing variability or environmental changes. Asymptotic tracking means that the response of the scanner (including its shape, phase and amplitude) will match the reference (and its shape, phase and amplitude). Based on nonlinear dynamic models of the scanner system, nonlinear control algorithms can compensate for undesirable dynamic effects. Furthermore, linear or nonlinear system identification can determine parameters of the dynamic model such as the resonant frequency, allowing for such features as resonant frequency tracking (that is tracking of frequency of maximum amplitude) and adaptive control.

A nonlinear control scheme for asymptotic tracking can be used for the following scans, 1D and 2D, in the following three scan systems:

1. 1D scan using a 1D actuator (piezo tube or bimorph) for fast axis scan of resonant optical fiber:
   a. track reference waveform—matching
      waveform shape,
      amplitude,
      phase, and
      frequency; and
   b. remove nonlinear whirl.

Tracking allows the creation of stable coherent images, regardless of differences between scanner actuator and optical fiber due to manufacturing variability, and within the same scanner actuator and optical fiber, due to environmental changes. Tracking also allows the FOV to be changed, resulting in a zooming feature. In open loop, changing the FOV also changes the phase.

Whirl is a nonlinear cross-plane instability. If the optical fiber is driven in the horizontal direction only, the instability vertically causes the optical fiber to vibrate both vertically and horizontally, forming ovals or rotated lines. Because the horizontal scan is not purely horizontal, including a vertical scanner does not produce a raster scan, but instead, produces a complex Lissajous pattern. If a raster scan is assumed, but not produced, then the image is either distorted or incoherent. Analysis of the dynamic models of the optical fiber scanning system when applied via a robust state space controller with feedback linearization show that 1D tracking also removes whirl. Because the axes are cross-coupled, whirl (motion in the non-driven direction—vertical) decreases the amplitude in the driven direction—horizontal. When whirl is removed, the horizontal amplitude will increase.

Because the horizontal scan is periodic, there will be portions of the scan going left to right, then others right to left. If the acquisition (or display) is sequential, alternate lines will be flipped, resulting in an incoherent image. Every other line could be discarded, but this approach would result in a lower vertical resolution. Alternatively, every other line could be flipped and re-interleaved computationally in the buffer, resulting in a coherent image of the same resolution as sampled. The phase of the scanner to the reference is important when re-interleaving, and if phase is not correctly maintained, the alternate lines will not match up. However, the phase may change due to environmental effects or changes in drive amplitude (for zooming).

The sampling or output rate can be adjusted electronically to account for nonlinear scans. For instance, most resonant scans are sinusoidal, resulting in barrel distortions due to the nonlinear scan speed, but regular sampling rates. In this case, the distortion is known to be sinusoidal, so the barrel distortion can be eliminated computationally in the image buffer. Alternatively, the application of variable sampling rates will also remove the distortion.

Due to the "softening" or "hardening" spring effects of the nonlinearity, there may be two possible amplitudes at a single frequency, resulting in a high FOV and a low FOV. Disturbances may cause the amplitude to "jump" from the high FOV to the low FOV. In order to achieve the high FOV amplitude, the frequency must be swept. With a "softening spring effect" starting below the jump, the frequency must be swept up until the jump occurs, then swept down to the maximum FOV. If the frequency starts above or at the jump, the frequency must be swept down until the maximum FOV occurs. The opposite holds true for a "hardening spring effect." By adding a dither signal to the drive signal, the stability of the high FOV amplitude can be increased, preventing the jump downwards. Alternatively, dither can be used to cause the jump upwards, without sweeping the frequency of actuation.

2. 2D scan using 2D actuator (quartered piezo tube or two axis bimorph)
   a. spiral scan tracking; and
   b. propeller scan tracking.

Tracking matches the scanner output shape, phase, amplitude, and frequency to a reference waveform. This technique simplifies acquisition, because the 2D position of the spot at each moment in time can be assumed, and the appropriate pixel recorded or displayed.

For a spiral scan, the reference waveforms are horizontal and vertical sinusoids of the same frequency, but 90° out of phase; the amplitude of these waveforms has a sawtooth envelope, with a frequency one-fourth the frame rate. Tracking control causes the output to follow this reference. This step removes the deleterious effects of low damping (such as ringing and undesired toroidal scanning at high frame rates), which other techniques (open loop, PLL, etc.) cannot control. Tracking also accounts for amplitude dependant changes in phase, which occur every frame.

For a propeller scan, the reference waveforms are horizontal and vertical sine waves of the same frequency, but in-phase. The horizontal sine wave amplitude is varied sinusoidally at a frequency equivalent to one-quarter of the frame rate, and the vertical sine wave amplitude is varied co-sinusoidally, again at a frequency equal to one-quarter of the frame rate. Tracking control causes the output to follow this reference. This technique will also remove the whirl, which makes the "propeller" look like a rotating oval instead of a rotating straight line.

In the spiral scan, the sawtooth envelope expands, contracts, expands, and contracts the sinusoid amplitude in each period. The relative phases are 0°, 0°, 180°, and 180°. Computationally, an adjustment is made for these differences in apparent order of samples to achieve four frames per scan period. That is, with the first expansion being the reference, the first contraction is flipped upside down, the second expansion is flipped right-to-left, and the second contraction is flipped upside down and right-to-left.

2D Scan Using 1D Actuator (Bimorph or Split Piezo Tube)

A 2D scan can be produced using a 1D actuator by taking advantage of the nonlinear whirl. Whirl causes an oval shaped scan from forced vibrations in only one axis. The amplitude envelope of the sinusoidal drive signal can be modulated in a sawtooth pattern similar to the propeller scan. The whirl will contract and expand with the sawtooth envelope. The phase and amplitude of the whirl are not controllable in open loop. It is therefore preferable to use feedback control to control the phase and amplitude of the whirl.

The whirl amplitude can be controlled by adding a dither signal to the drive signal in the single axis of actuation, e.g., x-axis. The dither signal is high frequency, and it does not affect the x-axis scanner response because of the low pass nature of the x-axis dynamics. However, the y-axis scanner response is affected through the nonlinear cross coupling of the two axes. This dither signal, v, is related to the y-axis position and speed and the x-axis frequency and phase by the relationship, $v=K*y*y"* \cos(\omega t)$.

Alternatively, using a nonlinear control technique called "feedback linearization," a relationship between the drive signal u, and the vertical (non-driven) axis y can be found. The drive signal can be shaped such that there are linear tracking error dynamics. Standard linear regulation schemes (such as state space techniques) or nonlinear regulation schemes can be used to drive the tracking error to zero. Alternatively, nonlinear tracking schemes (sliding mode control) can be used directly on the nonlinear u to y relation. Robustness of the error dynamics regulation or the tracking schemes makes the scan insensitive to model parameter inaccuracies or changes (e.g., temperature) and to higher modes or other dynamics not included in the dynamic model.

The relationship between u and y has an "ill-defined relative degree," which creates large drive signals whenever the product $x*y\sim 0$. A fix is to let u go to zero as $x*y$ goes to zero within certain boundary constraints on $x*y$. To control the x-axis scanner response, an outer nonlinear control loop is added, and the drive signal is made a combination of the y-axis control and x-axis control. This technique works for large amplitude circular scans, such as toroids. Applications of toroidal scans are endoscopic imaging within hollow vessels that are remapped into panoramic or cylindrical images, while toroidal image displays can present peripheral information. Otherwise, the central (space-filling) pixels of the controlled toroidal scan must be mapped according to open loop control strategies outlined before, where the feedback control sensors determine the pixel placement within the scan.

Three methods of electronic feedback control have been proposed for the high FOV and possibly high degree of nonlinearity within the micro-fabricated waveguide scanning systems. The first method controls a 1D actuator to produce 1D scan patterns. The second method controls two actuators used to produce 2D scan patterns. The third method controls a single actuator to produce a nonlinear 2D scan pattern. All three methods are employed to maintain a well-defined 2D pattern of motion of the waveguide at a specified frequency of operation. Due to the nonlinearity of the micro-fabricated scanner, these three methods are superior in performance to methods that require linear systems and do not keep frequency constant, such as those that employ PLLs.

A final control method is proposed to reduce the radius of curvature of the arc formed when the waveguide scans in 2D. By axially moving the waveguide during the lateral scan motion, the curvature of an arc 138 can be reduced to that of an arc 146, as illustrated in FIGS. 11A and 11B, respectively. A waveguide 130 is excited into near resonance by a piezoelectric bimorph actuator 132, causing a tapered portion 134 of the waveguide to bend as a distal tip 136 moves through arc 138. Control 40 provides the driving current to the piezoelectric bimorph actuator through leads 42. In FIG. 11B, an axial actuator 142 is added and controlled by current supplied through a lead 144. Axial actuator causes the waveguide to move back and forth along its longitudinal axis relative to a reference 60, in synchrony with the movement of the distal tip of the waveguide, so that as the waveguide reaches an end of arc 146, the waveguide is moved distally an amount ΔD, which is sufficient to compensate for the movement of the distal tip away from a plane that is orthogonal to the longitudinal axis and extends through the center of arc 146. The same axial correction is applied at the opposite end of arc 146. At the middle of arc 146, the axial transducer will have moved the waveguide proximally along the longitudinal axis of the waveguide, relative to its position at the ends of the arc.

Generating a flatter plane of the moving point source at the distal end of the waveguide can improve the optical performance of the scanner, such as the lateral resolution or compensation for optical aberrations. In a second embodiment, a scanning waveguide with a micro-lens at the distal tip has ideal optical properties if the optical beam appears to come from a single position in space. In this second case, the axial position of the waveguide is adjusted to compensate for an effective moving source during the scan. In both embodiments, the axial position of the waveguide can be adjusted using the separate axial actuator (e.g., piezoelectric, electrostrictive, or magnetostrictive) shown in FIG. 11B, or alternatively, with a tube (not shown) made from piezoelectric material (i.e., a piezo tube), which moves the optical fiber in three axes (2D for laterally scanning and axially for improving the optical performance).

Other Contemplated Modifications of the Present Invention

The micro-fabricated waveguide can be an optical fiber made out of any transparent material for the particular wavelength range of electromagnetic radiation that is to be scanned. For the near UV, visible, and near IR wavelengths, the most common optical materials will be fused silica, quartz, sapphire, glasses, and clear plastics and polymer rubbers (for example polymethylmethacrylate (PMMA) and polydimethylsiloxane (PDMS). The optical fiber does not have to rely on total internal reflection to guide the electromagnetic radiation. For example, hollow tubes and tapered pipettes can be used that rely on oblique-angle reflection at high efficiencies. Reflection from metallic surfaces is another embodiment.

The cantilever can be made from any material (not an optical waveguide) as long as the tip contains an effective light source that can be moved, scanned, or vibrated into a high displacement or high deflection angle. Most preferably the cantilever will contain the leads to a light source micro-fabricated at the optical fiber distal tip, such as a micro-light emitting diode (LED), nano-laser, or vertical-cavity surface-emitting laser (VCSEL). However, this effective light source could be a micro-mirror that re-directs a beam of light or that scatters light to create an effective point source from being illuminated by incident radiation. The incident energy source that excites and possibly drives the scanner in motion does not have to be of the same form as the light output, e.g., microwave radiation or ultrasonic energy might be used to generate the scanning light source.

The micro-machined cantilever waveguide can be used as a scanning optical detector in addition to or instead of a scanning optical illuminator. Thus, a photodetector might replace the micro light source at the tip of a non-transmissive scanning cantilever.

Mechanical resonance is not required for all embodiments and applications of these devices. For example, a cantilever that is scanned at non-resonant frequencies may be preferred for optical switching applications.

Micro-fabricating of waveguides and the micro-optical fabrication of lenses, as well as the operation of the devices do not have to be done one at a time, but can also be made and used in parallel. For example, the micro-fabricated waveguide scanning devices can be made by batch processing, whereby they are created, assembled, processed, and/or used in linear, 2D, and 3D arrays. Processes used for micro-fabricating MEMS and IC devices are applicable.

The methods of micro-fabrication and micro-machining are not limited to methods that remove or simply redistribute waveguide material. Additional waveguide material can be added by crystal growth, vapor, sputter, and chemical deposition, gluing, bonding, welding, etc.

The method of heating and pulling the softened waveguide material can be applied to produce non-axially symmetric geometries by nonuniformlyly heating or cooling, and pulling with asymmetric tensile and compressive forces. For example, the micro-fabricated pulling of tapered waveguides could include a step that heats and presses the waveguide along one axis, making the waveguide asymmetric.

The method of acid etching can be modified by etching the waveguide in solutions of multi-layers of different solutions (such as an additional layer of organic liquid, or in baths that contain gradients of pH, acid concentration, or solute diffusion coefficients. The etching process can be influenced by confining the waveguide in a tube or other physical barrier that affects the etching rates axially and laterally along the waveguide. The method of etching can be modified to include flowing liquid acids or other solvents or vapors or abrasives that may vary in concentration or flow rate during the etching process. The method of etching can be varied by coating the waveguides with a layer that may be a graded or predetermined pattern of protection from etching, such as a layer of photoresist that has been exposed differentially to polymerization.

The method of chemical (e.g., acid) etching can include vapor etching, plasma etching, laser etching, electrolytic etching, liquid slurry etching, air-particulate erosion, and mechanical polishing and beveling.

The method of micro-lens fabrication can include single and repeated applications of UV-cure or heat-cure optical adhesives of various amounts, refractive indices, viscosities, hydrophobicities, adhesion properties, etc.

The method of micro-lens fabrication can include the attachment and bonding of spacers, sleeves (hollow tubes), micro-lenses (refractive lenses, gradient index lenses, and/or diffractive optical elements), micro-diffusers, etc.

The method of micro-fabrication of the optical waveguide can include various coatings of metals, metal compounds, dielectric compounds, dyes, pigments, polymers, liquid crystals, and/or scattering materials for the purpose of promotion of wave guiding and possibly scattering at the distal tip, prevention of light leakage from the sides, filtering the optical radiation, preventing reflection such as at the distal tip the waveguide, preserving optical polarization, producing optical modulation, etc.

The method of mechanically actuating the micro-fabricated waveguide into vibratory motion (resonant or non-resonant) can include methods such as piezoelectric electromechanical, electrothermal, opto-thermal, electromagnetic, galvanometric, magnetostriction, ultrasonic, electrostriction, and electrostatic from either base, side, and/or distal tip of the waveguide.

The action of the micro-fabricated waveguide can be in 1D, 2D, 3D, and/or rotational. The distal tip of the opto-mechanical waveguide can be driven in 2D patterns with 1D actuation due to nonlinear cross-coupling of the stresses and strains within the waveguide. Thus, both the linear and the nonlinear behaviors of the waveguide can be used for optical scanning in one, two, or three dimensions. At least three methods of 2D scanning include: (a) sweeping a 1D scan line by moving the entire waveguide and actuator or using an external optical deflector (mirror) to redirect the line scan; (b) creating a circular 2D scan pattern by employing two orthogonal actuators (e.g., using a piezoelectric tube with quadrant electrodes) or by the nonlinear cross-coupling from 1D actuation (e.g., using a piezo bimorph bender); and (c) rotating a linear scan line in a propeller pattern by either mechanically rotating the line scan assembly or electronically rotating the actuation using orthogonal actuators.

The activation (electric signal) of the electromechanical (piezoelectric) actuator need not be of a single (sinusoidal) frequency that corresponds to the single mechanical resonance frequency of the waveguide. For example, the electrical signal used for actuation of the bimorph actuator can be more complex in amplitude than a sinusoid (square or triangular profile), containing more than one frequency component. If an asymmetric waveguide is used with separated mechanical resonances of vibration along the orthogonal axes, the two or more excitation waves having different frequency components can be combined to drive the actuator and/or waveguide into two or more distinct motions or patterns simultaneously.

Optical sensing of the waveguide position may use the same optical illumination used for the desired application instead of using a separate light source. For example, the reflection from the front lenses may be used to sense where the optical illumination is directed out from the scanning waveguide. It is contemplated that an optical surface can have facets cut, etched, or cast across two dimensions to reflect a portion of the optical beam back to optical sensors that detect the light and its angle of reflection.

Optically sensing the micro-fabricated waveguide position over time can use an additional light source, either (a) mixed with the optical radiation before entering the waveguide such as IR light mixed with visible light for a micro-display application, (b) an IR emitter-detector within a small integrated circuit (IC) package that detects light bouncing off the moving waveguide, or (c) separated source (s) and single- and multi-element optical sensors that might be on opposing sides of the scanning waveguide. By introducing a new light source, the waveguide position does not rely on the same optical radiation that is scanned for the purpose of image display, acquisition, sensing, or switching. Although this active optical sensing method introduces an additional light source, the wavelength, polarization, modulation frequency and amplitude, and physical orientation can be optimized to not interfere with the main application of the optical scanner. These optical measurement techniques can be similar in implementation to those used for scanning probe microscopes. An additional applicable technique is the placement of fine grid lines that are scattered or absorbed by only the additional radiation used for determining waveguide position. The fine grid lines may have absolute positional information, such as a 2D array of different grid line thickness.

Non-optical sensing of the micro-fabricated waveguide position over time can use quadrant piezoelectric thin films, piezoresistive layers, magnetostrictive and/or electrostrictive thin films, micro-magnetic detection, electrostatic detection, ultrasonic detection, etc.

By knowing the waveguide position and the level of illumination, there can be specific control of the image displayed or image acquired at pixel-to-pixel resolution. This capability is different from that of displays or cameras that use pixel-arrays, which are usually not adjustable at the pixel level and enables additional control over image display and processing, such as electro-optical pixilation, and post-processing adaptive and convolution algorithms.

The micro-fabricated waveguide can support (transmit) a wide range of optical frequencies or wavelengths. This feature allows for spectroscopic, fluorescence, thermal, and other multi-wavelength imaging capabilities, as well as optical feedback control of waveguide motion.

Optical methods for controlling or eliminating slight whirl by condensing or re-imaging to a line can be accomplished with a correctly aligned cylindrical lens. A toroidal scan may be condensed optically to a solid circular scan using lenses, cone shaped mirrors, and/or equivalent prisms. In the case of condensing a toroid, the innermost radius can be focused to a spot, while the outer edge and intermediate radial positions of the scan can be focused to concentric circles about that spot. Mechanical stops can be used for controlling the position of vibratory nodes and/or the maximum extent of scanning amplitudes.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

What is claimed is:

1. A scanner, comprising:
    (a) a waveguide having a distal end and a proximal end, said distal end being formed to have a nonlinear taper that decreases in size along a longitudinal axis of the waveguide, toward a distal tip of the waveguide;
    (b) a scanning actuator disposed adjacent to the waveguide, said scanning actuator driving the waveguide to vibrate the distal tip in a desired scanning motion; and
    (c) a control circuit that is coupled to the scanning actuator, said control circuit being adapted to selectively energize the scanning actuator to move the distal tip of the waveguide so as to scan a field of view.

2. The scanner of claim 1, wherein the distal portion of the waveguide comprises at least two distinct sections of differing radii around the longitudinal axis of the waveguide, each section having a different resonance when driven by the scanning actuator, so that the two distinct sections are able to move as decoupled bodies when driven by the scanning actuator.

3. The scanner of claim 2, wherein one of the two sections is driven to resonate about a first axis that is orthogonal to the longitudinal axis, and the other section is driven to resonate about a second axis that is substantially orthogonal to the longitudinal axis and to the first axis so that a scan rate of the waveguide about the first axis is different than about the second axis.

4. The scanner of claim 1, wherein a hinge portion adjacent to the distal tip of the waveguide is reduced in cross-sectional size relative to proximal and distal portions of the waveguide that are immediately adjacent to the hinge portion.

5. The scanner of claim 4, wherein the hinge portion is disposed along the longitudinal axis of the waveguide where a node is formed when the waveguide is driven into resonance by the scanning actuator, and wherein the waveguide is driven at least at a resonance of mode two.

6. The scanner of claim 5, wherein the distal tip disposed beyond the hinge portion is substantially more rigid than the hinge portion.

7. The scanner of claim 1, further comprising a mass element that is disposed proximate the distal tip of the waveguide to reduce a positional displacement of the distal tip without substantially reducing an angular displacement of the distal tip when the distal end of the optical is driven by the scanning actuator.

8. The scanner of claim 7, wherein the mass element comprises a lens that is coupled to the distal tip of the waveguide.

9. The scanner of claim 8, wherein the lens is integrally formed from the waveguide.

10. The scanner of claim 1, wherein the scanning actuator causes the distal end of the waveguide to scan in a near resonant motion in at least a second order mode.

11. The scanner of claim 1, wherein the scanning actuator applies force to the distal end of the waveguide, causing the distal tip of the waveguide to describe one of:
    (a) a circular motion;
    (b) a helical motion;
    (c) a Lissajous pattern;
    (d) an arc;
    (e) a whirl pattern;
    (f) a rotating elongated propeller pattern; and
    (g) a raster scanning pattern.

12. The scanner of claim 1, wherein the scanning actuator applies a force that is substantially orthogonal to the direction of actuator displacement, said force causing vibration of the distal tip of the waveguide.

13. The scanner of claim 1, further comprising a linear actuator that is coupled to the control circuit, said linear actuator periodically varying a force applied to the waveguide and directed generally along the longitudinal axis of the waveguide, said scanning actuator causing the distal end of the waveguide to describe an arc, said controller controlling the forces applied by the linear actuator and the scanning actuator so as to substantially flatten the arc.

14. The scanner of claim 1, further comprising a microlens formed on the distal tip of the waveguide.

15. The scanner of claim 1, wherein the distal tip of the waveguide is caused to move in a pattern that scans a region disposed adjacent to the distal tip of the waveguide.

16. The scanner of claim 1, wherein the distal tip of the waveguide is driven in a pattern desired for one of:
    (a) an image acquisition of a region disposed adjacent to the distal tip of the waveguide; and
    (b) an image display on a region illuminated with light emitted from the distal tip of the waveguide.

17. The scanner of claim 1, wherein the scanning actuator comprises one of a bimorph piezoelectric actuator, a tube actuator, an electro-thermal actuator, an opto-thermal actuator, an electromagnetic actuator, a galvanometric actuator, a magnetostriction actuator, an ultrasonic actuator, an electrostriction actuator, and an electrostatic actuator.

18. The scanner of claim 1, wherein the scanning actuator is configured to have a resonant frequency that is selected to be substantially equal to a mechanical resonant frequency of the waveguide about at least one axis of movement.

19. A method for creating a hinge in a light guide, comprising the steps of:
    (a) providing a waveguide with a tapered portion having a cross-sectional size that decreases toward an end of the waveguide, along a longitudinal axis of the waveguide;
    (b) heating, a material comprising the waveguide at a point along the tapered portion where it is desired to produce the hinge sufficiently so that the material flows and is capable of being deformed, but remains viscous;

(c) substantially reducing the cross-sectional size of the tapered portion at the point where the hinge is desired after the material has been heated in step (b), to produce a necked-down section comprising the hinge; and (d) enabling the taper portion of the waveguide to cool to an ambient temperature, said waveguide more readily bending at the hinge than at other portions of the tapered section when driven by an applied force.

20. The method of claim 19, wherein the step of heating is carried out using a coherent light source to heat the material.

21. A method for creating a hinge in a light guide, comprising the steps of:

(a) providing a waveguide with a tapered portion having a cross-sectional size that decreases toward an end of the waveguide, along a longitudinal axis of the waveguide; and (b) immersing the tapered portion of the waveguide into fluid having a plurality of layers, including an acid layer disposed between inert liquid layers, so that a point along the tapered portion where it is desired to produce the hinge is immersed in the acid layer, said acid layer etching the tapered portion of the waveguide, to produce a reduced diameter section comprising the hinge, said waveguide more readily bending at the hinge than at other portions of the tapered section when driven by an applied force.

22. A method for forming a micro-lens on a waveguide, comprising the steps of:

(a) providing a waveguide having a tapered cross-sectional size toward a distal end along a longitudinal axis of the waveguide;

(b) applying a drop of an optical adhesive material adjacent to the distal end of the waveguide;

(c) rotating the waveguide while the waveguide is directed radially relative to a center of rotation, causing the optical adhesive material to form a micro-lens having a desired shape at the distal end of the waveguide; and (d) causing the optical adhesive material to become set in the desired shape of the micro-lens.

23. The method of claim 22, wherein the step of causing the optical adhesive material to become set comprises the step of curing said material with light of a predefined range of wavelengths.

24. The method of claim 22, wherein the step of causing the optical adhesive material to become set comprises the step of curing said material with heat applied thereto.

25. The method of claim 22, wherein the step of causing the optical adhesive material to become set is carried out while the waveguide is being rotated.

26. The method of claim 22, further comprising the steps of:

(a) directing light through the waveguide while it is rotating;

(b) monitoring characteristics of the light emanating from the micro-lens; and (c) determining whether the micro-lens has achieved a desired form, based upon the characteristics of the light emanating from the micro-lens, to determine when to carry out the step of causing the optical adhesive material to become set.

27. A method for forming a micro-lens on a waveguide, comprising the steps of:

(a) directing a beam of energy at a distal tip of the waveguide to heat a material comprising the distal tip;

(b) heating the distal tip of the waveguide with the beam of energy to melt the material;

(c) forming the micro-lens from a droplet of the material that has been melted;

(d) applying a force to share the micro-lens so as to achieve desired optical properties for the micro-lens; and (e) allowing the droplet to cool.

28. The method of claim 27, wherein the force is a centrifugal force applied by rotating the waveguide while a longitudinal axis of the waveguide is generally radially aligned relative to a center of rotation.

29. The method of claim 27, wherein the force is applied along an axis of the waveguide using a driver that moves the waveguide along its longitudinal axis.

30. The method of claim 27, further comprising the step of monitoring light that has passed through the droplet to determine the optical properties of the micro-lens and to control the step of forming the droplet to achieve the desired optical properties for the micro-lens.

31. A scanner, comprising:

(a) a waveguide having a distal end and a proximal end, said distal end being formed to have a taper that decreases in size along a longitudinal axis of the waveguide, toward a distal tip of the waveguide;

(b) a micro-lens formed on the distal tip of the waveguide;

(c) a scanning actuator disposed adjacent to the distal end of the waveguide, said scanning actuator causing the distal tip of the waveguide to vibrate in a desired scanning motion; and (d) a control circuit that is coupled to the scanning actuator, said control circuit being adapted to selectively energize the scanning actuator to move the distal tip of the waveguide so as to scan a field of view.

32. The scanner of claim 31, wherein the disial portion of the waveguide comprises at least two distinct sections of differing radii around the longitudinal axis of the waveguide, each section having a different resonance when driven by the scanning actuator, so that the two distinct sections are able to move as decoupled bodies when driven by the scanning actuator.

33. The scanner of claim 32, wherein one of the two sections is driven to resonate about a first axis that is orthogonal to the longitudinal axis, and the other section is driven to resonate about a second axis that is substantially orthogonal to the longitudinal axis and to the first axis so that a scan rate of the waveguide about the first axis is different than about the second axis.

34. The scanner of claim 31, wherein a hinge portion adjacent to the distal tip of the waveguide is reduced in cross-sectional size relative to portions of the waveguide that are immediately adjacent to opposite ends of the hinge portion.

35. The scanner of claim 34, wherein the hinge portion is disposed along the longitudinal axis of the waveguide where a node is formed when the waveguide is driven into resonance by the scanning actuator, so that the distal tip disposed beyond the hinge portion is driven at least at a resonance of mode two.

36. The scanner of claim 31, wherein the scanning actuator causes the distal end of the waveguide to move in a near resonant motion in at least a second order mode.

37. The scanner of claim 31, wherein the scanning actuator applies a force to the waveguide, causing the distal tip of the waveguide to describe one of:
  (a) a circular motion;
  (b) a helical motion;
  (c) a Lissajous pattern;
  (d) an arc;
  (e) a whirl pattern;
  (f) a rotating elongated propeller pattern; and
  (g) a raster scanning pattern.

38. The scanner of claim 31, further comprising a linear actuator that is coupled to the control circuit, said linear actuator periodically varying a force applied to the waveguide and directed generally along the longitudinal axis of the waveguide, said scanning actuator causing the distal end of the waveguide to describe an arc, said controller controlling the forces applied by the linear actuator and the scanning actuator so as to substantially flatten the arc.

39. The scanner of claim 31, wherein the distal tip of the waveguide is driven in a pattern that scans a region disposed adjacent to the distal tip of the waveguide.

40. The scanner of claim 31, wherein the distal tip of the waveguide is driven in a pattern desired for one of:
  (a) an image acquisition of a region disposed adjacent to the distal tip of the waveguide; and
  (b) an image displayed on a region with light emitted from the distal tip of the waveguide.

41. The scanner of claim 31, wherein the scanning actuator comprises one of a bimorph piezoelectric actuator, a tube actuator, an electro-thermal actuator, an opto-thermal actuator, an electromagnetic actuator, a galvanometric actuator, a magnetostriction actuator, an ultrasonic actuator, an electrostriction actuator, and an electrostatic actuator.

42. A scanner, comprising:
  (a) an elongate structure having a distal end and a proximal end, said distal end being formed to have a nonlinear taper that decreases in size along a longitudinal axis of the structure, toward a distal tip of the structure;
  (b) a scanning actuator disposed adjacent to the structure, said scanning actuator driving the structure to vibrate the distal tip in a desired scanning motion; and
  (c) a controller that is coupled to the scanning actuator, said controller being adapted to selectively energize the scanning actuator to move the distal tip of the waveguide so as to scan the structure in the desired scanning motion.

43. The scanner of claim 42, further comprising an active device disposed proximate the distal tip of the structure, said active device being caused to move with the distal tip of the structure in the desired scanning motion.

44. The scanner of claim 43, wherein the active device comprises a light source.

* * * * *